(12) United States Patent
Sahib et al.

(10) Patent No.: US 11,907,396 B2
(45) Date of Patent: Feb. 20, 2024

(54) USING POLICIES TO COMPLY WITH A REQUEST FROM A PERSON FOR DATA THAT PERTAINS TO A PERSON

(71) Applicant: Salesforce, Inc., San Francisco, CA (US)

(72) Inventors: Shivan Kaul Sahib, Vancouver (CA); Marla Hay, Portland, OR (US); Yvonne Zhou, San Francisco, CA (US); Yu Chen, Bellevue, WA (US)

(73) Assignee: Salesforce, Inc., San Francisco, CA (US)

( * ) Notice: Subject to any disclaimer, the term of this patent is extended or adjusted under 35 U.S.C. 154(b) by 316 days.

(21) Appl. No.: 16/752,506

(22) Filed: Jan. 24, 2020

(65) Prior Publication Data

US 2021/0232700 A1   Jul. 29, 2021

(51) Int. Cl.
*G06F 21/62* (2013.01)
*G06F 16/2455* (2019.01)

(52) U.S. Cl.
CPC .... *G06F 21/6245* (2013.01); *G06F 16/24564* (2019.01)

(58) Field of Classification Search
CPC ........... G06F 21/6245; G06F 16/24564; G06F 21/6227; G06F 21/335; H04L 63/102
USPC .......................................................... 726/1
See application file for complete search history.

(56) References Cited

U.S. PATENT DOCUMENTS

| | | | |
|---|---|---|---|
| 7,730,478 B2 | 6/2010 | Weissman | |
| 10,740,475 B2 | 8/2020 | Eidson et al. | |
| 11,216,460 B2 | 1/2022 | Hay et al. | |
| 2009/0094193 A1* | 4/2009 | King | G06F 21/6227 |
| 2019/0340388 A1 | 11/2019 | Eidson | |
| 2019/0342088 A1 | 11/2019 | Eidson | |
| 2020/0097574 A1 | 3/2020 | Hay et al. | |
| 2020/0097680 A1 | 3/2020 | Hay et al. | |
| 2020/0106780 A1* | 4/2020 | Malliah | G06F 16/437 |
| 2020/0327252 A1* | 10/2020 | McFall | G06F 21/78 |
| 2020/0364669 A1 | 11/2020 | Hay et al. | |
| 2021/0149874 A1 | 5/2021 | Hay et al. | |

\* cited by examiner

*Primary Examiner* — Jeffrey C Pwu
*Assistant Examiner* — Nega Woldemariam
(74) *Attorney, Agent, or Firm* — Nicholson, De Vos, Webster & Elliott, LLP; Daniel J. Lee

(57) ABSTRACT

Described are methods and systems for using policies to comply with a person's request for data pertaining to the person, pursuant to applicable data privacy laws. A policy is retrieved responsive to receiving a query that includes data to identify records that store data pertaining to the person. The policy indicates first and second database objects, and respective first and second sets of fields, which store data that pertains to persons. The policy is applied. Applying the policy includes retrieving, as first values, data stored in the first set of fields of a first record associated with the data in the query, and retrieving, as second values, data stored in the second set of fields of a second record associated with the first record. The first and second values, and the names of the fields from which they were retrieved, are stored in a document.

20 Claims, 10 Drawing Sheets

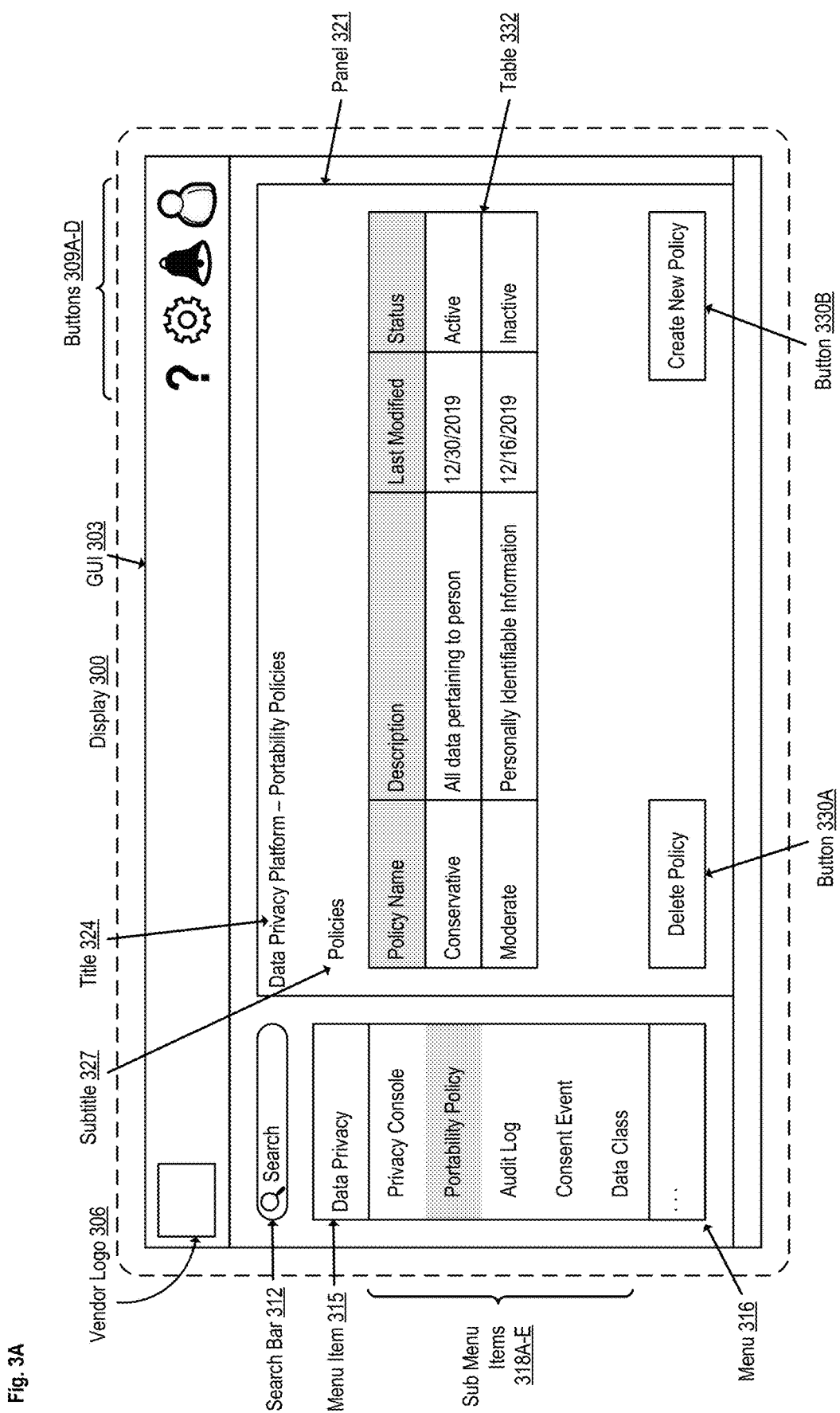

Fig. 4B

Display, in the first UI element, a first plurality of fields of the selected first database object 410

Display in the first UI element at least one of the first plurality of fields as selected by default 415

Display in the first UI element at least one of the first plurality of fields as selected by default based on the selected fields storing data pertaining to persons 420

Fig. 4C

Display, in the second UI element, a second plurality of fields of the selected second database object 450

Display in the second UI element at least one of the second plurality of fields as selected by default 455

Display in the second UI element at least one of the second plurality of fields as selected by default based on the selected fields storing data pertaining to persons 460

Display in the second UI element at least one of the second plurality of fields as selected by default based on the selection of the first set of one or more fields including a field that stores a type of information that the at least one of the second plurality of fields stores 465

USING POLICIES TO COMPLY WITH A REQUEST FROM A PERSON FOR DATA THAT PERTAINS TO A PERSON

TECHNICAL FIELD

One or more implementations relate to complying with data privacy laws; and more specifically, to complying with a request from a person for data that pertains to the person pursuant to such laws.

BACKGROUND ART

Data privacy laws and regulations (such laws and regulations collectively referred to herein as "laws") are proliferating, especially in the area of consent. Data privacy laws and regulations may restrict, amongst other things, the collection, disclosure, and/or use of information pertaining to a person. Moreover, data privacy laws may provide a person with the right to request, and to receive, data that pertains to the person from an entity that stores such data (e.g., a right to data portability). Data that pertains to a person might include personally identifiable information (i.e., data that can be used to identify the person); and data that otherwise relates to the person (e.g., biographical data, financial data, contact information, etc.).

An entity might store, in a database, data that pertains to a person. A database might comprise one or more database objects (DBOs) that are managed by a database management system (DBMS), each DBO may include a set of records, each record may comprise a set of fields, and each field stores one or more values (also referred to as data). A record may take different forms based on the database model being used and/or the specific DBO to which the record belongs; e.g., a record may be: 1) a row in a table of a relational database; 2) a JavaScript Object Notation object; 3) an eXtensible Markup Language document; 4) a key-value pair; etc. A DBO can be unstructured or have a structure defined by the DBMS and/or defined by a user. In some implementations of a cloud database (a database that runs on a cloud platform and that is provided as a database service), identifiers are used instead of database keys, and relationships are used instead of foreign keys.

While implementations may use one or more types of databases, a relational database with tables is sometimes described to simplify understanding. In a relational database management system, each relational database table (which is a type of DBO) generally contains one or more data categories logically arranged as columns according to a schema, where the columns of the relational database table are different ones of the fields from the plurality of records (i.e., where the different ones of the fields each store data of the same type, and are each associated with the same name for the field), and where rows of the relational database table are different ones of a plurality of records and each contains an instance of data for each category defined by the fields. Thus, the fields of a record are defined by the structure of the DBO to which the field belongs. By way of example, a customer relationship management database may include a table that describes a customer with fields for contact information such as name, address, phone number, fax number, etc.

BRIEF DESCRIPTION OF THE DRAWINGS

Although the following figures depict various examples of implementations, alternative implementations are within the spirit and scope of the appended claims. In the drawings:

FIG. 3A is a diagram that shows a graphical user interface (GUI), which allows a user to manage policies for complying with a request from a person for data that pertains to the person, according to some implementations.

FIG. 4B is a flow diagram that shows methods for displaying fields of a first DBO for a user's selection when creating a policy for complying with a request from a person for data that pertains to the person, according to some implementations.

FIG. 4C is a flow diagram that shows methods for displaying fields of a second DBO for a user's selection when creating a policy for complying with a request from a person for data that pertains to the person, according to some implementations.

DETAILED DESCRIPTION

The following description describes implementations for using policies to comply with a request from a person for data that pertains to the person.

Figure 1A:
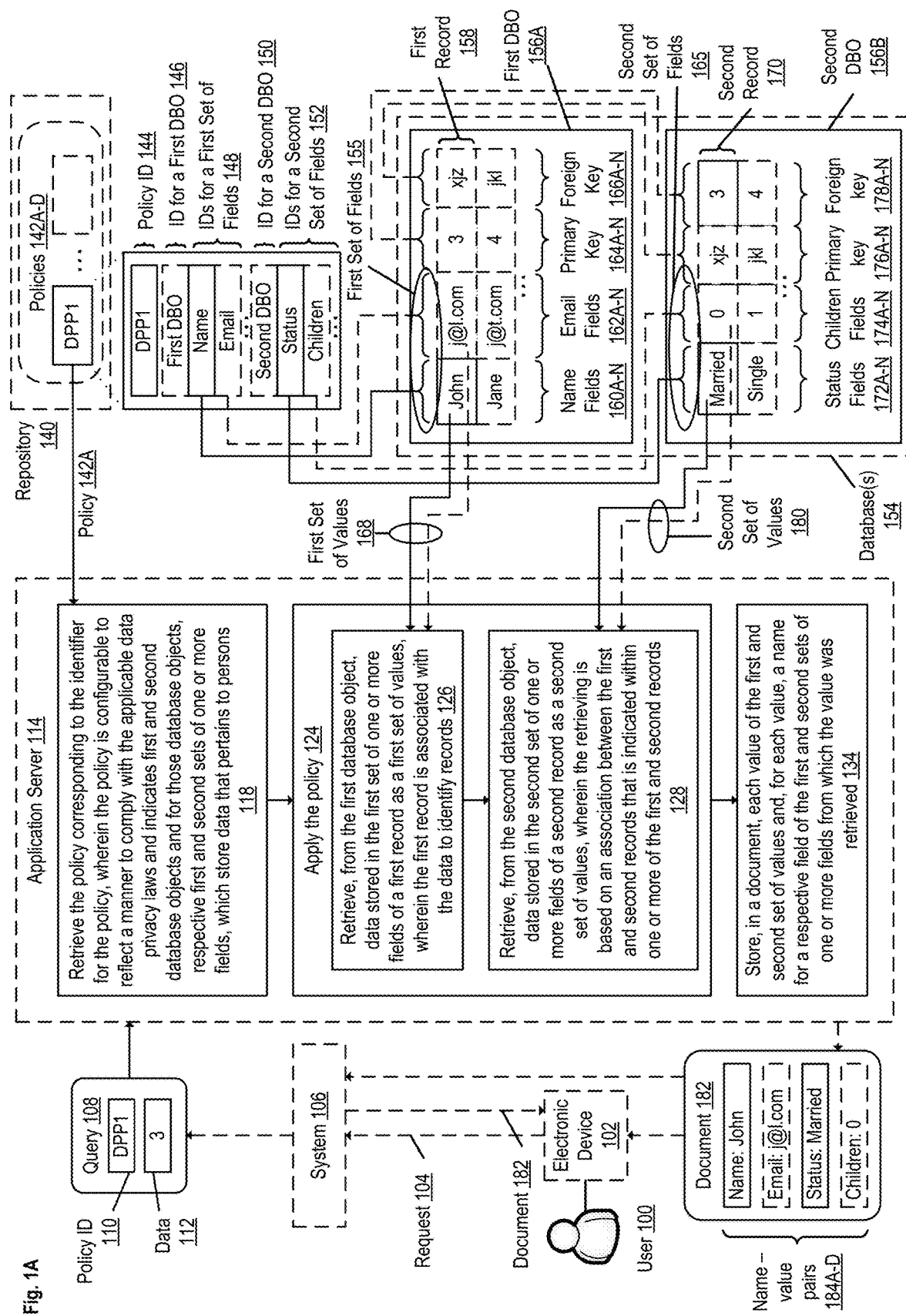
FIG. 1A is a block diagram that shows a system and method for using policies to comply with a request from a person for data that pertains to the person, according to some implementations.

FIG. 1A is a block diagram that shows a system and method for using policies to comply with a request from a person for data that pertains to the person, according to some implementations.

Systems and Methods for Using Policies

Issuing a Request

FIG. 1A shows user 100 of electronic device 102. User 100 submits to system 106 a request 104 for data that pertains to a person, pursuant to applicable privacy laws. User 100 might be the person for whom the request 104 is submitted or might act on behalf of the person. The person for whom the request 104 is submitted can be a natural person. However, a request 104 can be submitted for a legal entity (e.g., a company, a partnership, etc.). Although implementations are described herein that relate to requests 104 for data that pertain to a person pursuant to applicable data privacy laws, requests 104 may be submitted outside the purview of applicable data privacy laws. For example, an entity that stores data that pertains to a person may permit the person to request the data regardless of the person having a legal right to do so.

System 106 is any system that can submit query 108 for data that pertains to a person, responsive to receiving request 104. For example, in one implementation: 1) a person submits request 104 as or with a customer support request (e.g., via email, telephone, Short Message Service (SMS), a chatbot, a web portal, etc.); 2) a customer support representative or system 106 automatically creates a ticket based on the received request 104; and 3) system 106 or the customer support representative (through system 106, or otherwise) submits query 108 for the data that pertains to the person based on the created ticket. In some implementations, system 106 submits query 108 to application server 114 automatically (i.e., without human intervention). For example, system 106 might be a web application that submits query 108 to application server 114 automatically, responsive to receiving request 104 via user 100 interacting with the web application via electronic device 102. In other implementations, query 108 is submitted to application server 114 with human intervention. For example, having received request 104, a customer support representative might submit query 108 via system 106 to the application server 114 to respond to request 104. Query 108 is an electronic request for data, such as a call to an Application Programming Interface (API), a database, a webservice, etc. In some implementations, query 108 is submitted by user 100. In another implementation, query 108 and the request 104 are coextensive (i.e., user 100 submits query 108/request 104 to application server 114).

Query 108 includes a policy identifier (ID) 110 (i.e., an identifier for a policy) and data 112 to identify records that store data pertaining to a person. In the example shown in FIG. 1A, query 108 includes a policy ID 110 with a value of "DPP1" and data 112 with a value of "3."

Implementations may support different types of data 112 to identify records that store data pertaining to a person. For example, implementations might support 1) an ID for one or more records that store data pertaining to persons (e.g., a value of a primary key used to identify the one or more records); and/or 2) data that can be used to identify such records. Data that can be used to identify such records might include PII (e.g., a passport number, a social security number, an email address for the person, etc.), data that may or may not be considered PII or that otherwise relates to the person (e.g., biographical data, financial data, contact information, etc.), and/or one or more combinations of the foregoing.

Retrieve and Apply the Policy

FIG. 1A shows application server 114, which includes block 118, block 124, and block 134. In one implementation, responsive to receiving query 108, block 118 is performed.

In block 118, a policy 142 corresponding to the policy ID 110 included in query 108 is retrieved. Policy 142 is configurable (i.e., able to be adapted) to reflect a manner to comply with applicable data privacy laws. In one implementation, policy 142 indicates first and second database objects (DBOs) 156A and 156B and for those DBOs 156A and 156B, respective first and second sets of one or more fields 155 and 165, which store data pertaining to persons.

For example, FIG. 1A shows application server 114 retrieving policy 142A corresponding to the policy ID 110 with a value of "DPP1" included in query 108. Policy 142A includes 1) policy ID 144 (with a value of "DPP1"); 2) ID for a first DBO 146 (with a value of "First DBO"); 3) IDs for a first set of fields 148 (with a value of "Name" and optionally, a value of "Email"); 4) ID for a second DBO 150 (with a value of "Second DBO"); and 5) IDs for a second set of fields 152 (with a value of "Status" and optionally, a value of "Children"). Thus, policy 142A identifies 1) name fields 160A-N (and, optionally, email fields 162A-N) in first DBO 156A, and 2) status fields 172A-N (and, optionally, children fields 174A-N) in second DBO 156B. When applied by a policy engine executing on an electronic device (e.g., an electronic device on which application server 114 executes), policy 142A is to cause 1) data stored in name field 160 (and, optionally, email field 162) to be retrieved from first record 158 of the first DBO 156A (i.e., data stored in name field 160A and, optionally, email field 162A); and 2) data stored in status field 172 (and, optionally, children field 174) to be retrieved from second record 170 of the second DBO 156B (i.e., data stored in status field 172A, and, optionally, children field 174A). Put differently, a policy 142A-D identifies sets of fields 155 and 165 of multiple DBOs 156A-B from which to retrieve data pertaining to a person, responsive to a request 104 and corresponding query 108 for data pertaining to the person.

Implementations may support different contents for policies 142. For example, one implementation does not include an ID for the first DBO 146 and/or an ID for the second DBO 150. Instead, the implementation only includes IDs for a first set of fields 148 and IDs for a second set of fields 152. In such an implementation, the IDs for the DBOs 156 which include the first and second sets of fields 155 and 165 are inferred by: 1) determining which DBO 156 includes the first set of fields 155; 2) determining which DBO 156 includes the second set of fields 165; and 3) determining the IDs of those DBOs 156. Other implementations combine in a policy 142 each ID for a field of a DBO 156 with the ID for that DBO 156 (e.g., IDs for a first set of fields 148 include the value "First DBO:Name" rather than the value "Name"). The ID for a First DBO 146, ID for a Second DBO 150, IDs for a first set of fields 148, and IDs for a second set of fields 152 shown in policy 142A are examples. In a relational database management system (RDBMS) example, such IDs may not include whitespace (e.g., ID for a first DBO 146 might have the value "first_dbo" and the IDs for a first set of fields 148 might have the values "name" and "email" respectively).

Implementations support retrieving policy 142A from repository 140, which stores policies 142A-D. A repository is a store of policies, and can take various forms (e.g., a document management system, a filesystem, a database, a file server, a webservice, etc.). In other implementations, application server 114, or another component, stores policies 142A-D. Implementations may combine repository 140 and application server 114 such that latter hosts the former. Policies 142A-D can be stored in different ways. In some implementations, policies 142A-D are stored as documents (i.e., electronic records in a structured format). The documents might be in a human-readable format (e.g., text, JavaScript Object Notation (JSON), eXtensible Markup Language (XML), etc.) and/or a machine-readable format (e.g., in a binary format), which might also be human-readable (e.g., JSON, XML, etc.). In other implementations, policies 142A-D are stored as executable code or procedures. For example, an implementation might store policies 142A-D as a set of structured query language (SQL) queries, or as portions of executable code (e.g., functors, function pointers, scripts, etc.) whose execution performs one or more queries on database(s) 154.

After retrieving the policy 142 in block 118, flow passes from block 118 to block 124, in which the policy 142 is applied.

Block 124 includes blocks 126 and 128. In block 126, data stored in the first set of one or more fields 155 (i.e., the fields corresponding to the IDs for a first set of fields 148) of a first record 158 is retrieved from the first DBO 156A (i.e., the DBO 156 corresponding to the ID for a first DBO 146) as a first set of values 168. The first record 158 is associated with the data 112 included in query 108 (i.e., the data to identify records that store data pertaining to a person). As shown in FIG. 1A, the data 112 is the value "3." This value corresponds to the value of primary key 164 for the first record 158 (i.e., the value of primary key 164A). From block 126, flow passes to block 128.

In block 128, data stored in the second set of one or more fields 165 (i.e., the fields corresponding to the IDs for a second set of fields 152) of a second record 170 is retrieved from the second DBO 156B (i.e., the DBO 156 corresponding to the ID for a second DBO 150) as a second set of values 180. The retrieving is based on an association between the first record 158 and second record 170 that is indicated within one or more of the first record 158 and second record 170.

An association between records is data that allows for the identification of one or more of the records from data that identifies another of the records. For example, an association between records might be a shared key (e.g., a primary key that a foreign key references), another record that includes data to identify the records (e.g., the records' respective identifiers), etc. Thus, in one implementation, the association between the first record 158 and the second record 170 is based on the first DBO 156A including primary key 164 that the second DBO 156B references as foreign key 178.

A primary key is a set of fields in a DBO (e.g., a set of one or more columns in a table in a RDBMS), where the value(s) of the set of fields for a record uniquely identifies the record in the DBO. A foreign key is a set of fields in a DBO (e.g., a set of one or more columns in a table in an RDBMS), which references the primary key of another DBO. Including a primary key in one of first DBO 156A and second DBO 156B (e.g., primary key 164A-N, or primary key 176A-N, respectively), and a foreign key which references the primary key in the other of first DBO 156A and second DBO 156B (e.g., foreign key 166A-N, or foreign key 178A-N, respectively) provides advantages. For example, the DBO which includes the foreign key can be queried referring to the primary key. For a concrete example, if DBOs 156 can be queried using an SQL query, the retrieving operations of block 126 and block 128 can be performed by retrieving the result of a query such as "SELECT first_dbo.name, second_dbo.status FROM first_dbo, second_dbo WHERE first_dbo.primary_key="3" and second_dbo.foreign_key=first_dbo.primary_key." Querying DBOs 156 with one query in this fashion is likely faster than querying first DBO 156A with one query, and second DBO 156B with another query. Defining a datamodel to use primary and foreign keys provides other benefits (e.g., ensuring that first DBO 156A has only one record with a given value of the primary key 164, and ensuring that the second DBO 156B has only one record corresponding to that value).

Some implementations may disregard permissions granted to the user 100 on database(s) 154 when applying a policy 142. In some circumstances, permissions granted to user 100 (if any) do not include those required for at least one of retrieving the data stored in the first set of fields 155 of the first record 158 (e.g., in block 126) and retrieving the data stored in the second set of fields 165 of the second record 170 (e.g., in block 128). An implementation may effectively disregard permissions by a user of database(s) 154 with elevated privileges performing the retrieving data in one or both of block 126 and block 128 (e.g., a user in an administrator role). Effectively disregarding the permissions that user 100 may have to retrieve data from one or more of the DBOs 156 and/or databases(s) 154 favors compliance with a request 104 for data that pertains to a person.

Although described above in relation to two or three DBOs 156, in other embodiments the number of identified DBOs 156 may be larger. In particular, records in each DBO 156 might be associated with records in another DBO 156 (e.g., via primary and foreign keys) and each newly-identified DBO 156 may be examined for associations with another DBO 156 until a recursion point is reached (i.e., a previously identified DBO 156 is again identified) or no other DBOs 156 are identified. Examples involving two or three DBOs 156 are illustrative and not limiting.

From block 124, flow passes to block 134.

Storing Data in the Document

In block 134, each value of the first set of values 168 and second set of values 180 are stored in a document 182 and, for each value, a name for a respective field of the first set of fields 155 (i.e., the set of fields corresponding to the IDs for the first set of fields 148) and the second set of fields 165 (i.e., the set of fields corresponding to the IDs for the second set of fields 152) from which the value was retrieved is stored in the document 182. As shown in FIG. 1A, document 182 includes name-value pairs 184A-D. Specifically, name-value pairs 184A-D include, respectively: 1) the name "Name" and value "John," corresponding to the value "John" of name field 160 (with name "Name") of first record 158; 2) the name "Email" and value "j@1.com," corresponding to the value "j@1.com" of email field 162 (with name "Email") of first record 158; 3) the name "Status" and value "Married," corresponding to the value "Married" of status field 172 (with name "Status") of second record 170; and 4) the name "Children" and value "0," corresponding to the value "0" of children field 174 (with name "Children") of second record 170. Different ways of storing data in document 182 are discussed later herein referring to FIG. 2B.

Using policies 142A-D to comply with a request 104 from a person for data that pertains to the person provides several advantages. Using policies 142A-D allows for consistent treatment of a request 104 for data that pertains to persons. In turn, using policies 142A-D gives a measure of certainty in the data which is provided responsive to such a request. Moreover, users 100 of a system (e.g., system 106), such as customer service representatives, might lack the expertise to respond to a request 104 for data pertaining to a person, pursuant to applicable data privacy laws. An organization can thus define a set of policies 142A-D to use in responding to such a request. The organization's compliance with those laws in responding to the request 104 can thus be better assured. Therefore, using policies 142A-D to respond to a request 104 can reduce the organization's risk that compliance is not consistently achieved, and attendant risks (e.g., reputational risk, regulatory and legal risk, etc.). By configuring different policies 142A-D for use, an organization with operations and/or customers that span multiple jurisdictions can automate and simplify compliance with applicable privacy laws in those jurisdictions. Simplifying compliance reduces operational overhead for such an organization, which may be significant when the organization serves a large, dispersed customer base.

In the case of a vendor of a multi-tenant system, which provides a policy engine to its tenants for the tenants to respond to requests submitted by the tenants' customers, the vendor can configure the policies 142A-D for the tenants' use. The vendor can configure policies 142 that are common amongst tenants, and which reflect a shared interpretation of data privacy laws, which may apply to those tenants. For example, the vendor may configure policies 142A-D to represent respectively risk-averse and relatively risk-tolerant interpretations of data privacy laws. The vendor may then request each tenant of a plurality of tenants to elect, according to preference, one of the policies 142A-D to be applied to a request 104 for data that pertains to a person, pursuant to applicable privacy laws, submitted by a customer of that tenant. A vendor configuring one or more policies 142A-D provides efficiency: the policies need only be configured once and may be reused by several organizations to achieve compliance with applicable laws. The vendor configuring the policies 142A-D also provides efficiency for the vendor's platform because the policies 142A-D can be reused by multiple tenants, rather than each tenant having to configure and use bespoke policies.

Automatic Policy Selection

Some implementations may allow for automatically selecting a policy 142 to be applied responsive to a request 104 for data that pertains to a person. For example, a policy 142 may be automatically selected based on a set of criteria that includes one or more of 1) the jurisdiction in which the data is stored (e.g., the jurisdiction in which database(s) 154 are located/hosted), 2) the jurisdiction in which the organization that stores the data operates, 3) the jurisdiction in which the person requesting the data is a resident, national, or citizen, 4) whether the organization that stores the data is relatively risk-tolerant or risk-averse, etc.

In one implementation, which allows for automatically selecting a policy 142, query 108 need not include a policy ID 110. In contrast to block 118, rather than retrieving the policy 142 corresponding to the policy ID 110, criteria to be used to automatically select a policy 142 is retrieved. Retrieving the data optionally includes retrieving, from a database (e.g., from database(s) 154), data which identifies a jurisdiction in which the person is a resident, national, or citizen. In some implementations, the retrieval may be based on a default policy 142, which indicates a DBO 156 and a field of that DBO 156 from which to retrieve such data. After retrieving the data for the set of criteria to be used, a given one of policies 142A-D is selected to be applied, based on the data. Flow then passes to block 124, and the selected policy 142 is applied. For example, for data which identifies that user 100 is a resident of a member state of the European Union, one policy 142 from the set of policies 142A-D is selected to be applied, where the selected policy 142 represents a manner to comply with a request 104 for data that pertains to a person, pursuant to the General Data Protection Regulation (GDPR).

Implementations that allow for automatic selection of a policy 142 provide further advantages in automating the use of policies 142 to respond to requests 104. Notably, an entity that submits a request 104 for data that pertains to a person, such as system 106, need not know which policy 142 to apply to respond to the request 104. Potential errors in policy 142 selection can therefore be reduced.

Figure 1B:
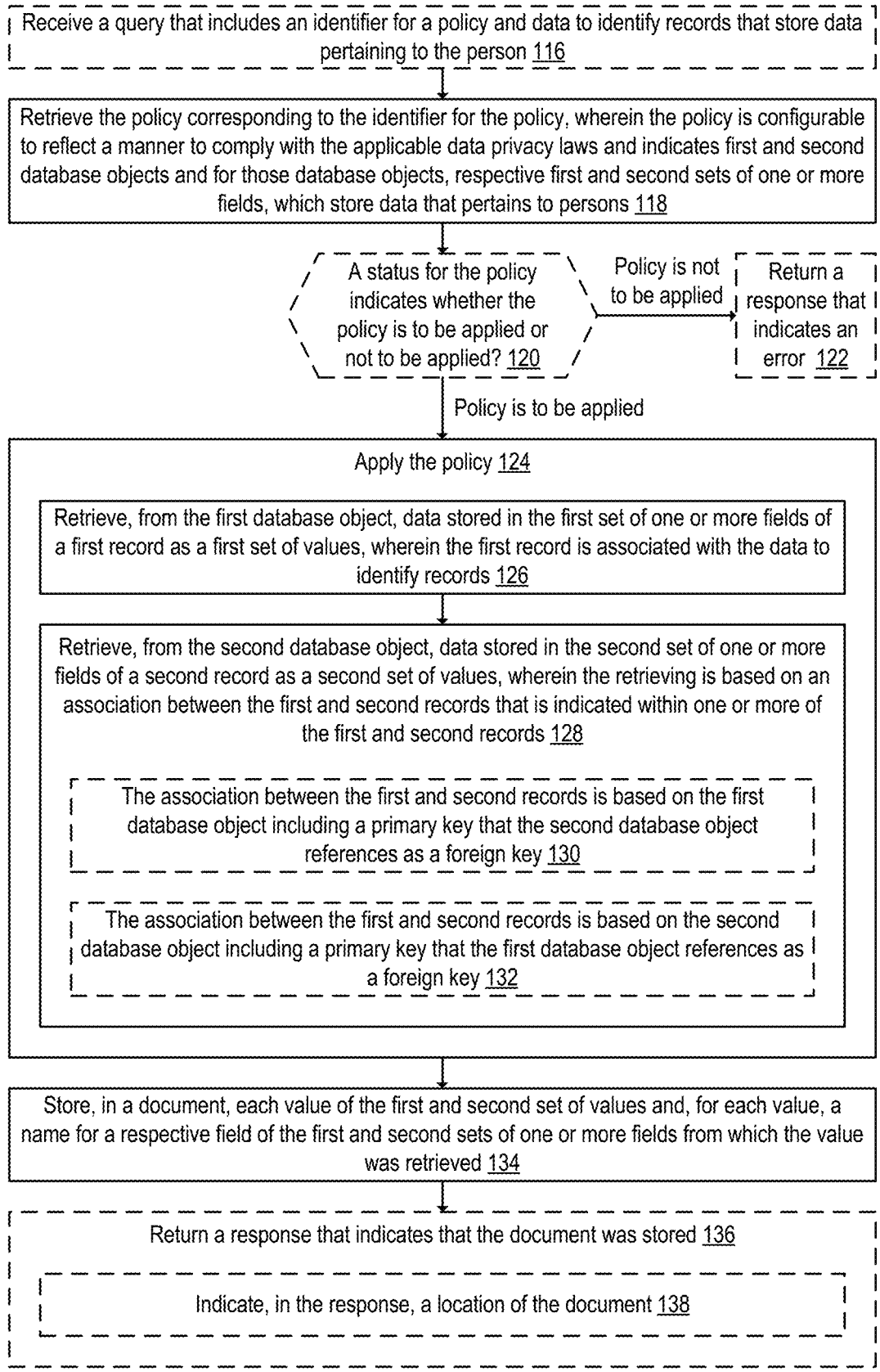
FIG. 1B is a flow diagram that shows a method for using policies to comply with a request from a person for data that pertains to the person, according to some implementations.

FIG. 1B is a flow diagram that shows a method for using policies 142 to comply with a request 104 from a person for data that pertains to the person, according to some implementations. As shown in FIG. 1B, the method may commence at operation 116.

Policy Status

In block 116, a query that includes an ID for a policy and data to identify records that store data pertaining to the person is received. For example, referring back to FIG. 1A, a query 108 that includes policy ID 110 and data 112 is received by application server 114. From block 116, flow passes to block 118, which was described referring to FIG. 1A. From block 118, flow passes to block 120 in implementations that support block 120.

Block 120 includes determining whether a status for the policy (e.g., policy 142 in FIG. 1A) indicates whether the policy is to be applied or not to be applied. Put differently, a status indicates whether a policy is available for use responsive to a query (e.g., query 108 in FIG. 1A) that identifies the policy (e.g., policy 142 in FIG. 1A). To illustrate, a policy might require testing or approval before the policy is deployed for use in complying with a request. Thus, indicating with a status that a policy is to be applied or not to be applied allows for deployment of a policy for testing or other purposes before being used more broadly. The status might be stored in the policy itself, or otherwise be associated with the policy (e.g., in a DBO, which stores the ID for the policy and the status). Responsive to determining that the policy is not to be applied, flow passes from block 120 to block 122 and a response is returned that indicates an error (e.g., referring to FIG. 1A, a response is returned to system 106 and/or user 100 via electronic device 102). Responsive to determining that the policy is to be applied, flow passes from block 120 to block 124. Block 124 was described referring to FIG. 1A.

Associations

In contrast to block 124 as shown in FIG. 1A, block 124 shown in FIG. 1B may include block 130 and/or block 132, each as part of block 128. In block 130, the association between the first and second records is based on the first database object including a primary key that the second database object references as a foreign key. Taking an example from FIG. 1A, the association between the first record 158 and second record 170 is based on the first DBO 156A including a primary key 164 that the second DBO 156B references as a foreign key 178. In block 132, the association between the first and second records is based on the second database object including a primary key that the first database object references as a foreign key. Taking another example from FIG. 1A, the association between first record 158 and second record 170 is based on second DBO 156B including primary key 176 that first DBO 156A references as foreign key 166. An implementation need not include both primary and foreign keys in each of first DBO 156A and second DBO 156B.

As discussed previously, implementations can use a different shared key mechanism to facilitate retrieving data from the first DBO 156A and second DBO 156B. For example, an implementation may include another DBO (e.g., a third DBO) which stores associations between the first DBO 156A and second DBO 156B. In such an implementation, the retrieving of block 128 may be based on an association that is indicated in a record of the third DBO. Referring to the example shown in FIG. 1A, if first DBO 156A, second DBO 156B, and the third DBO can be queried using SQL, block 128 can be implemented by retrieving the result of an SQL query, such as "SELECT second_dbo.status FROM second_dbo WHERE second_dbo.primary_key IN (SELECT second_dbo_primary_key FROM third_dbo WHERE third_dbo.first_dbo_primary_key="3")" where 1) the second DBO 156B has an ID with the value "second_dbo"; 2) a name for status fields 172A-N has the value "status"; 3) a name for the primary key fields 176A-N has the value "primary_key"; 4) the third DBO has an ID with the value "third_dbo"; and 5) the third DBO includes fields for which names are "first_dbo_primary_key" (corresponding to primary key 164A-N) and "second_dbo_primary_key" (corresponding to primary key 176A-N).

From block 124, flow passes to block 134, which was described referring to FIG. 1A.

Returning a Response

As shown in FIG. 1B, in implementations which support block 136, flow passes from block 134 to block 136. In block 136, a response is returned that indicates that the document was stored. In one implementation, the document may be returned with the response. For example, referring to FIG. 1A, application server 114 responds to one or both of electronic device 102 and system 106 with document 182. When document 182 is returned to system 106, system 106 can make document 182 available to the person who submitted request 104 for data that pertains to the person. For example, if query 108 is associated with a customer support request for which a ticket is created (e.g., in system 106), system 106 may make document 182 available to the person for retrieval through the ticket. In block 138, a location of the document is indicated in the response. For example, the location of the document may be indicated via a Uniform Resource Locator (URL).

Referring back to FIG. 1A, implementations may provide additional security to guard against inadvertent disclosure to a third party of a person's data when responding to a request 104 for data that pertains to the person. For example, an implementation may authenticate a user 100 before handling a request 104 from the user for data that pertains to a person. Authenticating a user 100 might include multi-factor authentication, and specifically, requiring the user 100 to confirm ownership of an email address or telephone number that is associated with the user's account (e.g., for system 106), and thus to confirm that the requested data belongs to the user 100. An implementation may store document 182 for only a limited period of time (e.g., a predefined number of hours, days, weeks, etc.) to reduce the risk that the document 182 is exposed (e.g., in a cyber-attack, due a security lapse, etc.). An implementation may encrypt document 182 according to a public key that the user 100 or electronic device 102 provides (e.g., in query 108, to system 106 when retrieving document 182 from system 106, etc.). An implementation may include in a log one or more entries that indicate: 1) a request 104/a query 108 was received; 2) data was stored in a document 182; 3) user 100 was authenticated; 4) a request to download document 182 was made; 5) document 182 was deleted after a pre-defined period of time for storing such documents elapsed; etc. Implementations may include other security features (e.g., encryption of transmissions between electronic device 102, system 106, application server 114; encryption of document 182 at rest, etc.).

Other Examples of Datamodels

Implementations have been described in which a policy 142 includes IDs for a first set of fields 148 (e.g., of first DBO 156A) and IDs for a second set of fields 152 (e.g., of second DBO 156B). Implementations may support policies which include more than first and second sets of fields for more than first and second DBOs.

Three Database Objects

Figure 2A:
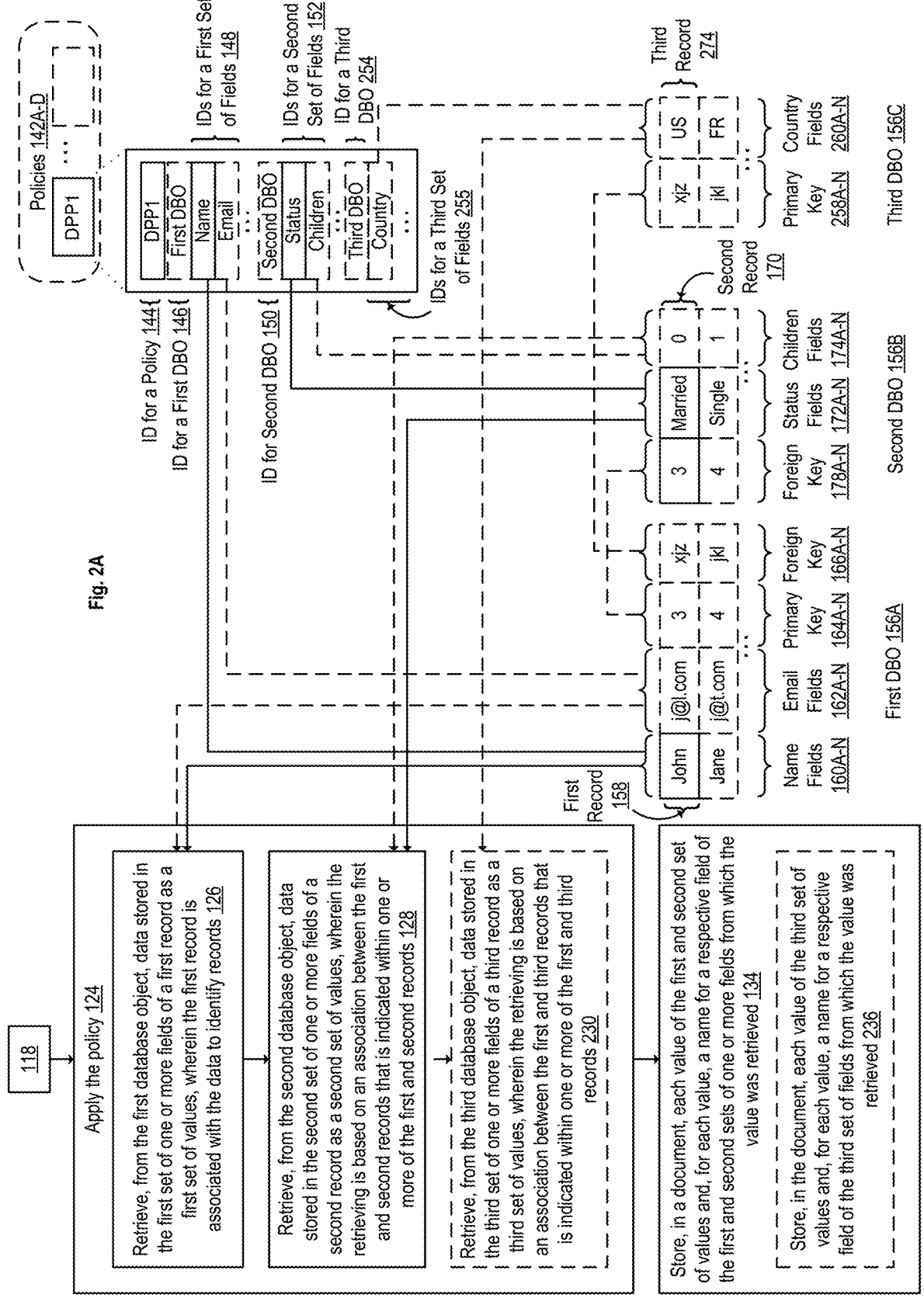
FIG. 2A is a block diagram that shows a system and method for using policies to comply with a request from a person for data that pertains to the person, where the data is stored in at least three database objects (DBOs), according to some implementations.

FIG. 2A is a flow diagram that shows a system and method for using policies 142A-D to comply with a request 104 from a person for data that pertains to the person, where the data is stored in at least three DBOs, according to some implementations. Elements shown in FIG. 2A with reference numbers common to elements shown in FIG. 1A and/or FIG. 1B have been described referring to same.

In contrast with FIG. 1A, FIG. 2A shows a policy 142A which further includes an ID for a third DBO 254 (with a value of "Third DBO") and IDs for a third set of fields 255 (with a value of "Country Field"). The value of the ID for a third DBO 254 (i.e., "Third DBO") identifies the third DBO 156C, which includes primary key 258A-N and country fields 260A-N. Primary key 258 references foreign key 166 of first DBO 156A.

As shown in FIG. 2A, the method of FIG. 2A includes the blocks 118, 124, and 134, which may operate as discussed in relation to FIGS. 1A and 1B. FIG. 2A also shows block 230 as part of block 124. In implementations which support block 230, flow passes from block 128 to block 230. In block 230, data stored in the third set of one or more fields (i.e., the set of fields corresponding to IDs of the third set of fields 255) of a third record (e.g., third record 274) as a third set of values are retrieved from the third DBO 156C. Thus, in one implementation, the operation of block 230 is to the third DBO 156C, the third set of fields (with IDs 255), and the third record 274, as the operation of block 128 is to the second DBO 156B, the second set of fields 165, and the second record 170. From block 230, flow passes to block 134. Block 134 is described referring to FIG. 1A.

In implementations shown in FIG. 2A, block 134 includes block 236. In block 236, each of the third set of values are stored in a document (e.g., document 182 shown in FIG. 1A) and, for each value, a name for a respective field of the third set of fields (i.e., corresponding to the IDs for the third set of fields 255) from which the value was retrieved is stored in the document. To continue the example shown in FIG. 1A, responsive to query 108 (which includes data 112, with a value of "3," to identify records that store data pertaining to a person), the value "US" is retrieved from country field 260 of third record 274. Thus, in block 236, a name-value pair is included in a document (e.g., document 182) where the name-value pair includes "Country: US".

Associations Between Database Objects

As shown in FIG. 2A, in some implementations, the association between 1) the first record 158 and the second record 170 is based on the first DBO 156A, including a primary key 164 that the second DBO 156B references as a foreign key 178; and 2) the association between the first record 158 and the third record 274 is based on the third DBO 156C including a primary key 258 that the first DBO 156A references as a foreign key 166. Such implementations allow for 1) retrieving data from fields of second record 170 (e.g., fields corresponding to IDs for the second set of fields 152 in a policy 142) based on the key that is shared between the first DBO 156A and the second DBO 156B (i.e., based on foreign key 178 which references primary key 164); and 2) retrieving data from fields of third record 274 (e.g., fields corresponding to IDs for the third set of fields 255 in a policy 142) based on the key that is shared between the first DBO 156A and the third DBO 156C (i.e., based on foreign key 166 which references primary key 258).

Other implementations are possible. For example, in an implementation with first, second, and third DBOs: 1) a first DBO may reference the second and third DBOs by including foreign keys that reference primary keys in the second and third DBOs; 2) a first DBO may reference the second and third DBOs by including a primary key that foreign keys included in the second and third DBOs reference; or 3) a first DBO may reference the second DBO by including a foreign key that references a primary key in the second DBO, and the third DBO may reference the first DBO by including a foreign key that references a primary key in the first DBO. Further implementations may reference any number of DBOs with combinations of primary and foreign keys, and/or associations which are stored in a separate DBO (as described previously referring to FIG. 1A).

No Association Between Database Objects

Implementations need not include associations between DBOs, however. For example, in one implementation, a policy 142 indicates a set of DBOs (e.g., by an ID for each of the DBOs), and for each of those DBOs, a set of one or more fields (e.g., by an ID for each field). Thus, retrieving data from the set of one or more fields indicated by a policy 142 need not be based on an association between the DBOs. A policy 142 is therefore configurable such that applying the policy 142 can include retrieving data from records in DBOs 156 in different database(s) 154, and/or retrieving data from records in DBOs 156 where the retrieving is not based on an association between the records. This configurability provides flexibility in responding to a request 104 for data that pertains to a person, when the data is stored in a datamodel which lacks integration. Thus, all manner of datamodels can be supported by implementations described herein.

Document for Storing Data

Figure 2B:
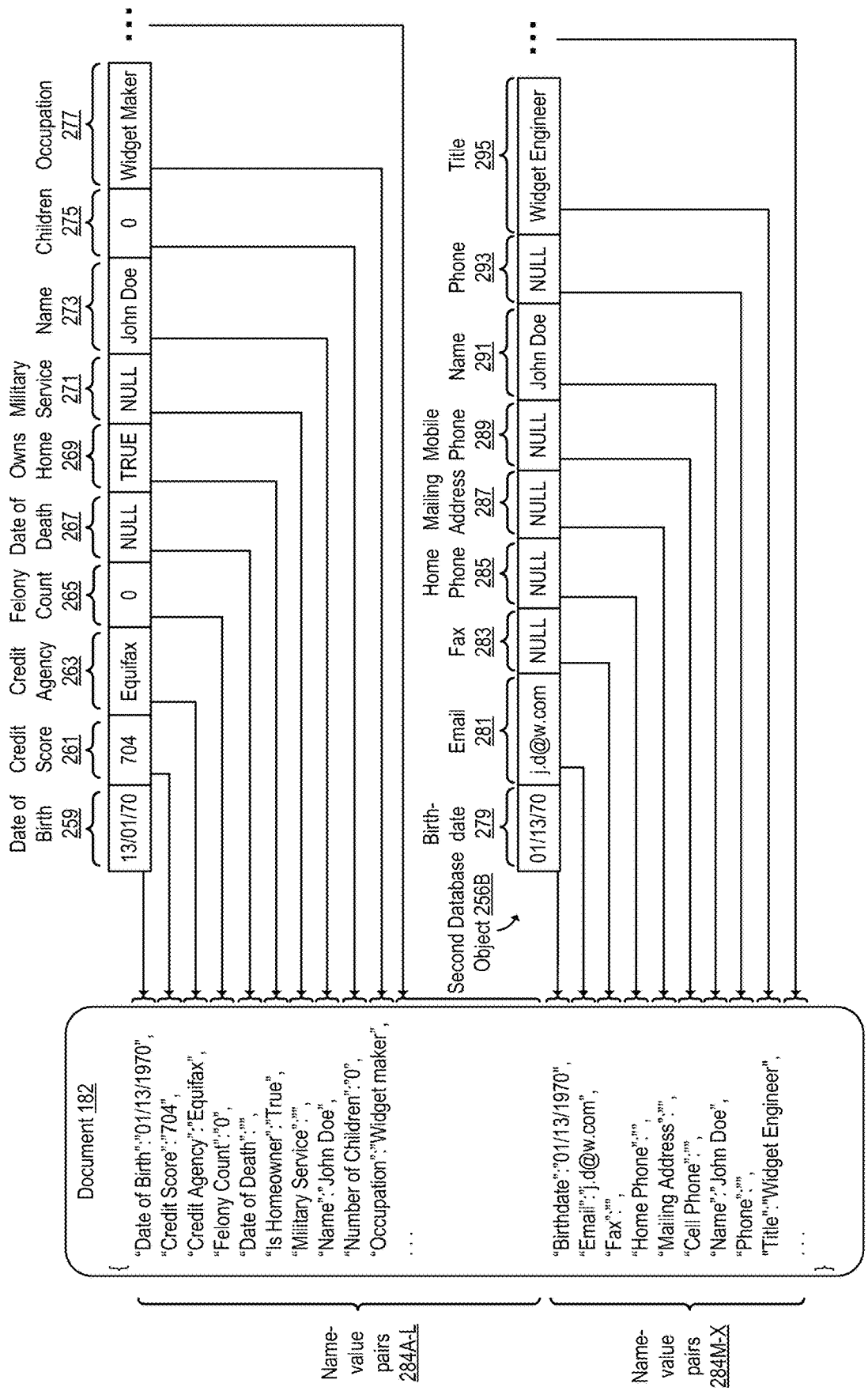
FIG. 2B is a diagram that shows a mapping between DBOs and a document, according to some implementations.

Implementations described herein also support different ways of storing data that pertains to a person in a document to be made available to the person. FIG. 2B is a diagram that shows a mapping between DBOs and a document, and serves to illustrate ways of storing, in a document, data that pertains to a person.

Mapping of Fields to Data in the Document

FIG. 2B shows a first DBO 256A and a second DBO 256B. First DBO 256A includes fields for date of birth 259; credit score 261; credit agency 263; felony count 265; date of death 267; owns home 269; military service 271; name 273; children 275; and occupation 277. These fields are mapped to name-value pairs 284A-L with respective values ""Date of Birth":"01/13/1970""; ""Credit Score":"704""; ""Credit Agency":"Equifax""; ""Felony Count":"0""; ""Date of Death":" ""; ""Is Homeowner":"True""; ""Military Service":" ""; ""Name":"John Doe""; ""Number of Children":"0""; and ""Occupation":"Widget maker"."

FIG. 2B also shows second DBO 256B including fields for birthdate 279; email 281; fax 283; home phone 285; mailing address 287; mobile phone 289; name 291; phone 293; and title 295. These fields are mapped to name-value pairs 284M-X with respective values ""Birthdate":"01/13/1970""; ""Email":"j.d@w.com""; ""Fax":" ""; ""Home Phone":" ""; ""Mailing Address":" ""; ""Cell Phone":" ""; ""Name":"John Doe""; ""Phone":" ""; ""Title":"Widget Engineer"."

As FIG. 2B shows, some implementations support a custom mapping of names of fields in first DBO 256A and/or second DBO 256B to names of the name-value pairs 284A-X in document 182. In the example shown, certain of the fields of first DBO 256A and second DBO 256B are different from the respective name for the field in name-value pairs 284A-X. Specifically: 1) the name for field owns home 269 of first DBO 256A is mapped to the name "Is Homeowner" of name-value pair 284F; 2) the name for field children 275 of first DBO 256A is mapped to the name "Number of Children" of name-value pair 284I; and 3) the name for field mobile phone 289 of second DBO 256B is mapped to the name "Cell Phone" of name-value pair 284R.

Implementations support a custom mapping in different ways. In one implementation, a mapping is provided in a policy 142 for one or more of the IDs for a first set of fields 148 and the IDs for a second set of fields 152. For example, referring back to FIG. 1A, 1) a policy 142A might include "Name:Full Name" in the IDs for a first set of fields 148 rather than "Name"; and 2) in block 134, the storing is performed such that the name stored in the document 182 for a respective field of the first and second sets of fields 155 and 165 is a name that the policy 142 indicates for the field. In this example, document 182 would include, for name-value pair 184A, "Full Name:"John"" rather than "Name:"John"."

In another implementation, the policy 142 does not include information to indicate a custom mapping. Instead, block 134 includes operations to 1) determine if a custom mapping is to be applied to one or more of the names for a respective field of the first and second sets of fields 155 and 165; and 2) responsive to determining that a custom mapping is to be applied, applying the custom mapping to the one or more of the names. The custom mapping can be stored and/or provided in various ways (e.g., in a DBO that specifies an alias for a name of a field; in a configurable document; in query 108; etc.).

Providing and applying a custom mapping to one or more of the names for fields to be stored in the document 182 allows the document 182 to be customized for different purposes. For example, a custom mapping may allow names for fields to be translated (e.g., to a different language that accords with a location of the person who is requesting data that pertains to the person), varied (e.g., to a different regional variation of a language that accords with that location), and/or normalized (e.g., if names for fields that store similar data are dissimilar, and/or if names for fields are abbreviated, clumsy, technical, etc.). Thus, a custom mapping allows for creating a document 182 in response to a request 104 for data that pertains to a person, where the document is better adapted for the person's use and/or to comply with applicable laws.

Formatting Data

Some implementations also support applying custom formatting to values stored in document 182 in name-value pairs 284A-X. In the example shown, certain of the values in fields of first DBO 256A and second DBO 256B are different from the respective values in name-value pairs 284A-X. Specifically, 1) the value of the field date of birth 259 (i.e., the value "13/01/70") of first DBO 256A is formatted to the value of name-value pair 284A (i.e., the value "01/13/70"); 2) the value of the fields date of death 267 and military service 271 of first DBO 256A (i.e., the value "NULL") is mapped to the value of name-value pair 284E and of name-value pair 284G (i.e., the value " "); and 3) the value of the fields fax 283, home phone 285, mailing address 287, mobile phone 289, and phone 293 of second DBO 256B (i.e., the value "NULL") is formatted to the value of name-value pair 284O, 284P, 284Q, 284R, and 284T (i.e., the value " ").

In one implementation, formatting of values stored in document 182 is performed based on a locale for the person that requested the data pertaining to the person. A locale is a set of data that defines how data is to be formatted; e.g., number formatting, currency formatting, date-time formatting, address formatting, etc. A locale may also define a language and/or regional variant for data. Implementations may determine a locale for the person based on 1) data included in the query 108; 2) data in database(s) 154 that pertains to the person (e.g., a value of country field 260 in third DBO 156C shown in FIG. 2A); 3) a default locale; etc.

When a locale has been determined, the locale can be applied by 1) determining a type of data (e.g., "DATE," "TIME," "INTEGER," etc.) for a field from which a value is to be stored in a document; 2) optionally, inferring a type of data based on the a name for the field (e.g., an email address for a field named "Email"; a telephone number for a field named "Home Phone"; etc.); 3) determining if the set of data for the locale includes a parameter for the determined or inferred type of data; and 4) based on a determination that the set of data includes a parameter, applying the parameter to format the value; and 5) storing, in the document, the formatted value.

Referring to the example shown in FIG. 2B, a locale may be applied to date of birth 259 by 1) determining that date of birth 259 stores data of a type "DATE" and/or based on the name of the field; 2) determining that the locale includes a parameter for such type of data (e.g., to format dates in the format "mm/dd/yy" where "mm" is two digits representing a month of the year, "dd" is two digits representing a day of the month, and "yy" is two digits representing the year); 3) applying the parameter to format the value for date of birth 259 (i.e., "13/01/70"); and 4) storing the formatted value of "01/13/70" in document 182.

Implementations may perform other formatting of data that is stored in document 182. For example, in one implementation, one or more values of the first and second sets of values is a NULL value (e.g., values retrieved from fields date of death 267 and military service 271 in first DBO 256A), and corresponding values that are stored in the document 182 indicate that no data pertaining to the person is stored in the respective one of the first and second sets of fields (i.e., the fields store a NULL value). Including in document 182 fields for which no data is stored can reassure user 100 that document 182 is exhaustive. In another implementation, the ordering of name-value pairs 284A-X (or a subset thereof) in document 182 is customizable. For example, name-value pairs 284A-X (or a subset thereof) may be stored in document 182 in an order according to 1) the order in which the fields corresponding to the names of the name-value pairs is included in the policy 142; 2) an alphabetical order based on the names of the name-value pairs; 3) an order otherwise specified in the policy (e.g., by a numeral appended to each ID of the IDs for the first set of fields 148 and the IDs for the second set of fields 152); etc.

Format of the Document

Some implementations also support different formats for the document 182 and/or its contents. In FIG. 2B, the contents of document 182 is shown in JSON format, however this format is provided as an example and is not limiting. Other formats are possible. For example, name-value pairs 284A-X may be stored as plain text (i.e., without additional elements to conform with JSON or other formats), in a markup language (e.g., XML, HyperText Markup Language (HTML), TeX, etc.), in a page description language (e.g., PostScript, Portable Document Format (PDF)), in a Java properties file, etc. One or more images in document 182 may be stored in one or more formats (e.g., Joint Photographic Experts Group (JPEG), bitmap image file (BMP), graphic interchange format (GIF), etc.). Document 182 may be in a human-readable and/or machine-readable format. Moreover, document 182 may be a text file, a Portable Document Format (PDF) file, a Microsoft Word file, a comma-separated value (CSV) file, etc. In one implementation, a document 182 is created for each DBO for which IDs for fields are included in a policy 142, and those documents are archived (e.g., as a ZIP file, as a TAR file, etc.) to be made available to a person who requested data pertaining to the person.

Policy Management Service

GUI for Managing Policies

FIG. 3A is a diagram that shows a GUI, which allows a user to manage policies for complying with a request from a person for data that pertains to the person, as part of a policy management service, according to some implementations. A GUI is a user interface ("UI") that allows a user to interact with an electronic device through graphical elements. FIG. 3A shows a GUI 303 in a display 300. GUI 303 includes an optional vendor logo 306 (e.g., to brand GUI 303) and buttons 309A-D, shown with icons that respectively depict an interrogation mark, a cog, a bell, and a user. The buttons 309A-D are selectable and, when selected by a user, respectively provide to the user one or more of 1) help information, 2) settings information, 3) notifications, and 4) account information. Implementations may display none, some, or all of buttons 309A-D, and/or other buttons.

GUI 303 also includes a search bar 312 and menu 316. Search bar 312 allows a user to enter text and search menu 316 for menu item(s) (including menu item 315) and/or sub menu items (including sub menu items 318A-E) for items that match the entered text. Matched items may then be displayed in menu 316 (e.g., by filtering the menu items and/or sub menu items such that menu 316 only displays the matched items, by highlighting the matched items in menu 316, by displaying a pop-up menu that displays, and allows the user to select, the matched items, etc.). Menu 316 includes menu item 315 (shown with text "Data Privacy"); and sub menu items 318A-E (shown respectively with text "Privacy Console"; "Portability Policy"; "Audit Log"; "Consent Event"; and "Data Class"). Implementations may show different menu item(s) and/or sub menu items. In one implementation, each of sub menu items 318A-E is selectable, and when a user selects one of the sub menu items 318A-E, a corresponding panel is displayed. For example, panel 321 (as shown in FIG. 3A) may be displayed responsive to a user selecting sub menu item 318B (highlighted and shown with text "Portability Policy").

Panel 321 includes several UI elements, including 1) title 324 with text "Data Privacy Platform—Portability Policies"; 2) subtitle 327 with text "Policies"; 3) table 332; and 4) button 330A with text "Delete Policy" and button 330B with text "Create New Policy." A UI element is an element of which a UI is comprised, such as an input element (e.g., dropdown list, toggle), navigation element (e.g., search bar, button), informational element (e.g., text label, visualization, table), and container element (e.g., accordion, panel). Table 332 includes headings "Policy Name"; "Description"; "Last Modified"; and "Status."

Each row of table 332 provides, for a given policy that has been created, information that corresponds to each of the headings. For example, the top row of table 332 provides information for a policy with name "Conservative"; specifically, a description for the policy "All data pertaining to persons," that the policy was last modified on the date 12/30/2019, and a status for the policy of "Active." In one implementation, a row in table 332 is selectable such that a user may select a row for a policy, and then select a button to perform an action on that policy (e.g., an action of deleting the policy, effectuated through selecting the button 330A; an action of modifying the policy, effectuated through selecting a corresponding button; etc.). In one implementation, when a user selects a row in table 332 and then selects button 330A to delete the corresponding policy, the policy is deleted. For example, if the policy is stored in repository 140 (shown in FIG. 1A), deleting the policy includes issuing a request to repository 140 to delete a policy with the name specified in the selected row of table 332. In one implementation, selecting the button 330B (with text "Create New Policy") causes the display of panel 333 shown in FIG. 3B. One of skill in the art will recognize that other implementations may display panel 333 (or another GUI for creating a new policy) differently; e.g., selecting the button 330B may display a pop-up window that displays a GUI wizard for creating a policy (a GUI wizard is an ordered set of UI screens for accomplishing a specific task, such as creating a policy).

GUI for Creating a Policy

Figure 3B:
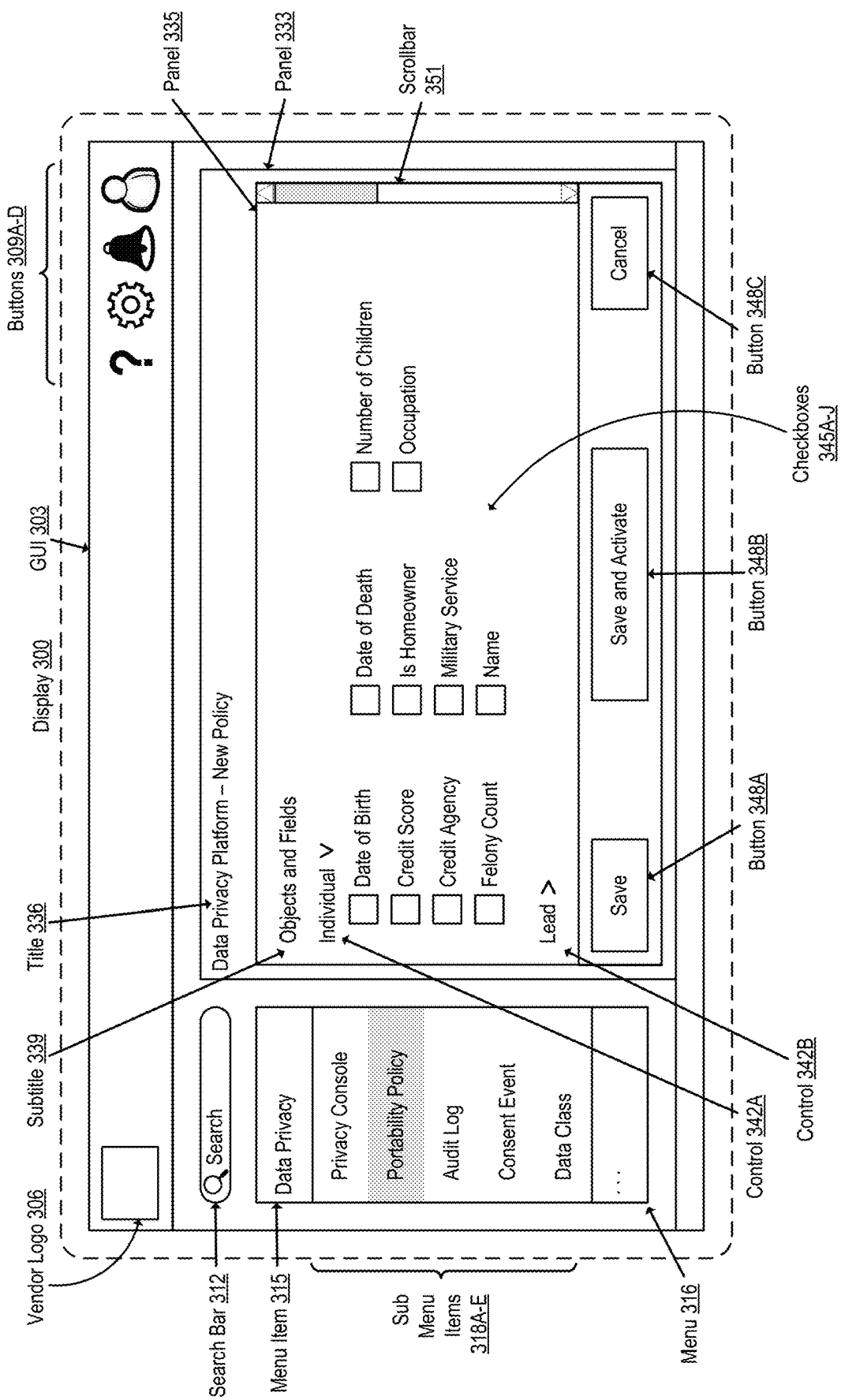
FIG. 3B is a diagram that shows a GUI which allows a user to create a policy for complying with a request from a person for data that pertains to the person, according to some implementations.

FIG. 3B is a diagram that shows a GUI which allows a user to create a policy for complying with a request from a person for data that pertains to the person, according to some implementations. Elements shown in FIG. 3B with reference numbers common to elements shown in FIG. 3A have been described referring to FIG. 3A. FIG. 3B shows GUI 303, which will be described referred to the flow diagram shown in FIG. 4A. Specifically, FIG. 4A shows block 400, in which a policy for use in complying with a request for data that pertains to a person, pursuant to applicable data privacy laws, is created.

FIG. 3B shows panel 333. Panel 333 includes title 336 with text "Data Privacy Platform—New Policy" and (sub)panel 335. Panel 335 includes subtitle 339 with text "Objects and Fields." Panel 335 also includes control 342A and control 342B, respectively associated with the names of two DBOs "Individual" and "Lead." Each name is followed by a caret symbol. In the example shown in FIG. 3B, control 342A and control 342B are each selectable by a user, and responsive to a selection, either expand (if previously collapsed) or collapse (if previously expanded) a section of panel 335 which includes a set of checkboxes (e.g., checkboxes 345A-J); i.e., control 342A and control 342B are headings of panels of an accordion UI element in panel 335, where each of the panels correspond to a different DBO that stores data pertaining to persons. In another implementation, each of the panels are shown in separate panels in a GUI wizard.

The DBOs represented by GUI 303 in panel 335 are identified in different ways. In one implementation, GUI 303 is configured to display one or more specified DBOs (e.g., where the DBOs are identified in a configuration file that GUI 303 reads). In another implementation, GUI 303 determines a set of one or more other DBOs to be displayed, based on the specified DBOs. For example, one of the other DBOs to be displayed may be determined dynamically based on associations between records in one of the specified DBOs and records in the other DBO (e.g., based on a primary key/foreign key association). Concretely, in one implementation, a first DBO is identified (e.g., from a configuration file). A second DBO is identified from the first DBO, based on one of the first and second DBOs including a primary key that a foreign key included in the other of the first and second DBOs references. A third DBO may be identified from the first or second DBO in a similar manner. In one implementation, additional DBOs are identified, based on an association in an already-identified DBO, until no more DBOs can be identified from the associations in already-identified DBOs (e.g., the already-identified DBOs either 1) do not include an association, or 2) include an association and a DBO has already been identified based on the association). Accordingly, the number of identified DBOs may be more than the two or three example DBOs described above. Dynamically determining one or more DBOs to be displayed allows for discovering new DBOs that have been added to a datamodel, and which may store data pertaining to persons.

Figure 4A:
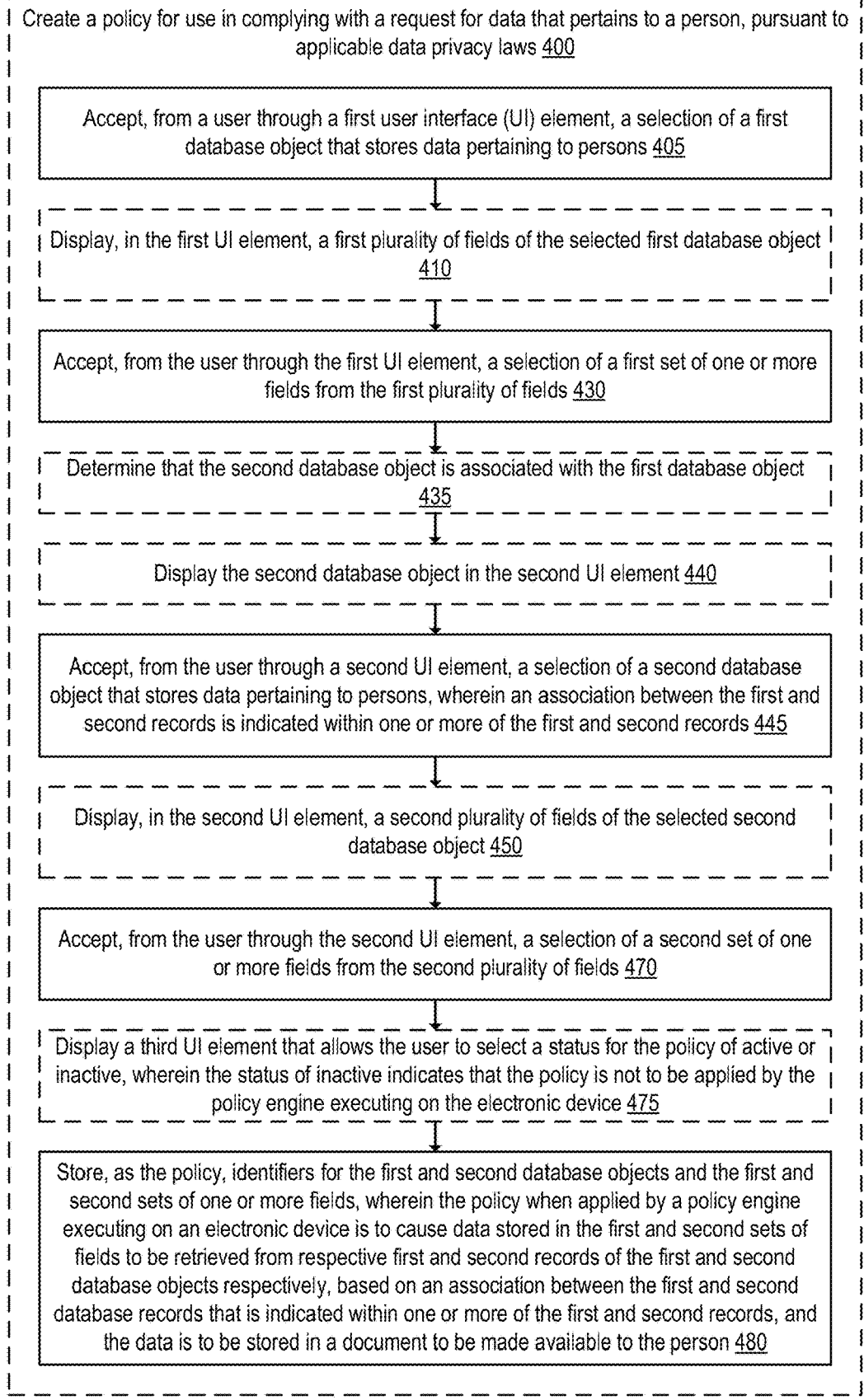
FIG. 4A is a flow diagram that shows a method for creating, via a GUI, a policy for complying with a request from a person for data that pertains to the person, according to some implementations.

Referring to block 405 of FIG. 4A, a selection of a first DBO that stores data pertaining to persons is accepted from a user through a first UI element (e.g., one of the panels of the accordion UI element that includes control 342A and control 342B). From block 405, flow passes to block 410.

In block 410, a first plurality of fields of the selected first DBO is displayed in the first UI element. For example, as shown in FIG. 3B, the panel of the accordion UI element in panel 335 with control 342A displays checkboxes 345A-J corresponding to fields of the selected DBO with name "Individual." A user may select one or more of checkboxes 345A-J to select corresponding fields in the DBO, and thus store a set of IDs for those fields in a policy to be created. Panel 335 also includes scrollbar 351 to allow the user view portions of panel 335 not displayed in the viewing area of panel 335 at a given time by scrolling through the portion displayed.

As FIG. 4B shows, some implementations include block 415. In block 415, at least one of the first plurality of fields is displayed in the first UI element as selected by default. For example, one or more of checkboxes 345A-J may be shown as selected (i.e., "checked") by default. This selection by default may be based on the selected fields storing data pertaining to persons (cf. block 420). For example, one or more fields may be selected by default based on the names of those fields being stored in a list (e.g., in a configuration file, in one or more database records, etc.) that is retrieved and that indicates that the fields store data pertaining to persons. Additionally, or alternatively, one or more fields may be selected by default based on fields which are commonly selected (e.g., fields which are selected in other policies which have been created). Selecting one or more fields by default provides benefits such as facilitating the creation of a policy and avoiding human error in failing to select fields of a DBO that stores data pertaining to persons. From block 410, flow passes to block 430.

In block 430, a selection of a first set of one or more fields from the first plurality of fields is accepted from the user through the first UI element. For example, a user's selection of one or more of checkboxes 345A-J is accepted responsive to the user checking those one or more checkboxes. From block 430, flow passes to block 435, if implemented.

Block 435 includes determining that the second DBO is associated with the first DBO. As mentioned previously, some implementations support dynamically determining one or more DBOs to be displayed in GUI 303, where a user of the GUI 303 can select one or more fields of the one or more DBOs that store data pertaining to persons. In one such implementation, GUI 303 is configured to display one or more specified DBOs and other DBOs are dynamically determined based on the specified DBOs. The dynamic determination can be performed before the specified DBO is displayed (e.g., before the DBO with name "Individual" is displayed in panel 335) or responsive to a user's selection of a specified DBO. In either case, any dynamically determined DBOs can be displayed responsive to the selection of a specified DBO (e.g., the "Individual" DBO). Thus, 1) responsive to the selection of the first DBO (e.g., selection of in panel 335 of control 324A, corresponding to the DBO with name "Individual"), that the second DBO (e.g., the DBO with the name "Lead") is associated with the first DBO is determined; and 2) responsive to determining that the second DBO is associated with the first DBO, the second DBO is displayed in the second UI element (i.e., control 324B with associated text "Lead"). From block 435, flow passes to block 440.

In block 440, the second DBO is displayed in the second UI element. For example, the text "Lead" and control 342B is displayed in a panel of the accordion UI element in panel 335. In another implementation, the text "Lead" and control 342B is shown in a separate window in a GUI wizard. From block 440, flow passes to block 445.

In block 445, a selection of a second DBO that stores data pertaining to persons is accepted from the user through the second UI element. For example, a selection by a user of GUI 303 of control 342B is accepted. As previously discussed, in some implementations, an association may be indicated within records in the first and second DBOs. From block 445, flow passes to block 450.

In block 450, a second plurality of fields of the selected second DBO is displayed in the second UI element. For example, referring back to FIG. 2B, a checkbox for each of the following fields of second DBO 256B are displayed, and for each, a name for the field: birthdate 279; email 281; fax 283; home phone 285; mailing address 287; mobile phone 289; name 291; phone 293; and title 295.

Some implementations include support for block 455, which may include one or more of block 460 and block 465 (as shown in FIG. 4C). In block 455, at least one of the second plurality of fields are displayed in the second UI element as selected by default, based on 1) the selected fields storing data pertaining to persons (cf. block 460); and/or 2) the selection of the first set of one or more fields including a field that stores a type of information that the at least one of the second plurality of fields stores (cf. block 465). Block 455 can be implemented in similar ways to block 420, which was discussed previously.

Block 465 can be implemented in various ways. In one implementation, block 465 includes 1) identifying the type of information that the field stores, and 2) matching the type of information to that stored in one or more of the second set of one or more fields. A type of information is information which has a common characteristic. For example, one type of information is a phone number, which comprises numbers for fixed telephones, cellular telephones, satellite telephones, voice-over-internet-protocol ("VOIP") telephones, etc. Another type of information is an email address, which comprises email addresses for personal use, email addresses for employment purposes, etc. A counterexample is a date (which might also be a type of data in some DBMSs). A date might correspond to a birthdate, a date of death, a date of delivery, a date that a request is received, etc. Put differently, a selection of a field that contains an email address may make the selection of another field that stores an email address more likely, whereas the selection of a field that stores a date might not make the selection of another field that stores a date more likely. Thus, in one implementation, the type of information is identified for the field, and that type of information is matched to that stored by one or more other fields. From block 450, flow passes to block 470.

In block 470, a selection of a second set of one or more fields from the second plurality of fields is accepted from the user through the second UI element. For example, a selection of checkboxes corresponding to one or more fields of second DBO 256B is accepted. From block 470, flow passes to block 475, if supported.

In block 475, a third UI element is displayed that allows the user to select a status for the policy of active or inactive, wherein the status of inactive indicates that the policy is not to be applied by the policy engine executing on the electronic device. For example, FIG. 3B shows button 348A with text "Save" and button 348B with text "Save and Activate." Both button 348A and button 348B are selectable by a user. In one implementation, responsive to a user selecting button 348A, a policy is saved with a status of "inactive." In contrast, responsive to a user selecting button 348B, a policy is saved with a status of "active." Responsive to a user selecting button 348C, the user's selections are discarded, and no policy is saved. From block 475, flow passes to block 480.

In block 480, identifiers for the first and second DBOs and the first and second sets of one or more fields are stored as the policy. In one implementation, the policy includes 1) an ID (which may be assigned automatically, or entered by a user in a UI element); 2) IDs for the selection of the first set of fields accepted from the user in block 430; 3) IDs for the selection of the second set of fields accepted from the user in block 470; and 4) optionally, an ID for one or each of the first DBO and second DBO from which the first and second sets of fields were selected. In one implementation, saving a policy includes storing the policy in a repository 140 (shown in FIG. 1A). The policy, when applied by a policy engine executing on an electronic device, is to cause data stored in the first and second sets of fields to be retrieved from respective first and second records of the first and second DBOs respectively (as discussed previously), based on an association between the first and second database records that is indicated within one or more of the first and second records, and the data is to be stored in a document to be made available to the person.

One of skill in the art could envisage myriad ways to create a policy for complying with a request from a person for data that pertains to the person. GUI 303 presents advantages for creating such a policy. In one implementation, GUI 303 only presents a user with DBOs (and fields from those DBOs) that store data pertaining to persons, for the user's selection. A user need not explore each DBO of database(s) 154 to create a policy. Moreover, GUI 303 allows a user to create a policy by interacting with a UI, rather than manually authoring the policy. Since the display and acceptance of fields and DBOs is via a GUI rather than via manual data entry, data entry errors are avoided. The structure of GUI 303 is suited to creating a policy as well. A user selects fields grouped by the DBO to which they belong; this facilitates selection of fields because a DBO is likely to represent a real-world object (e.g., an individual, an account, a lead), so the grouping provides a user with context for selecting fields. Fields are displayed such that they are selectable (e.g., via checkboxes). Some implementations allow for selection of fields by default. Thus, the structure, content, and functionality of GUI 303 facilitates a user creating a policy for use in complying with a person's request for data pertaining to the person.

Logging Requests

Figure 3C:
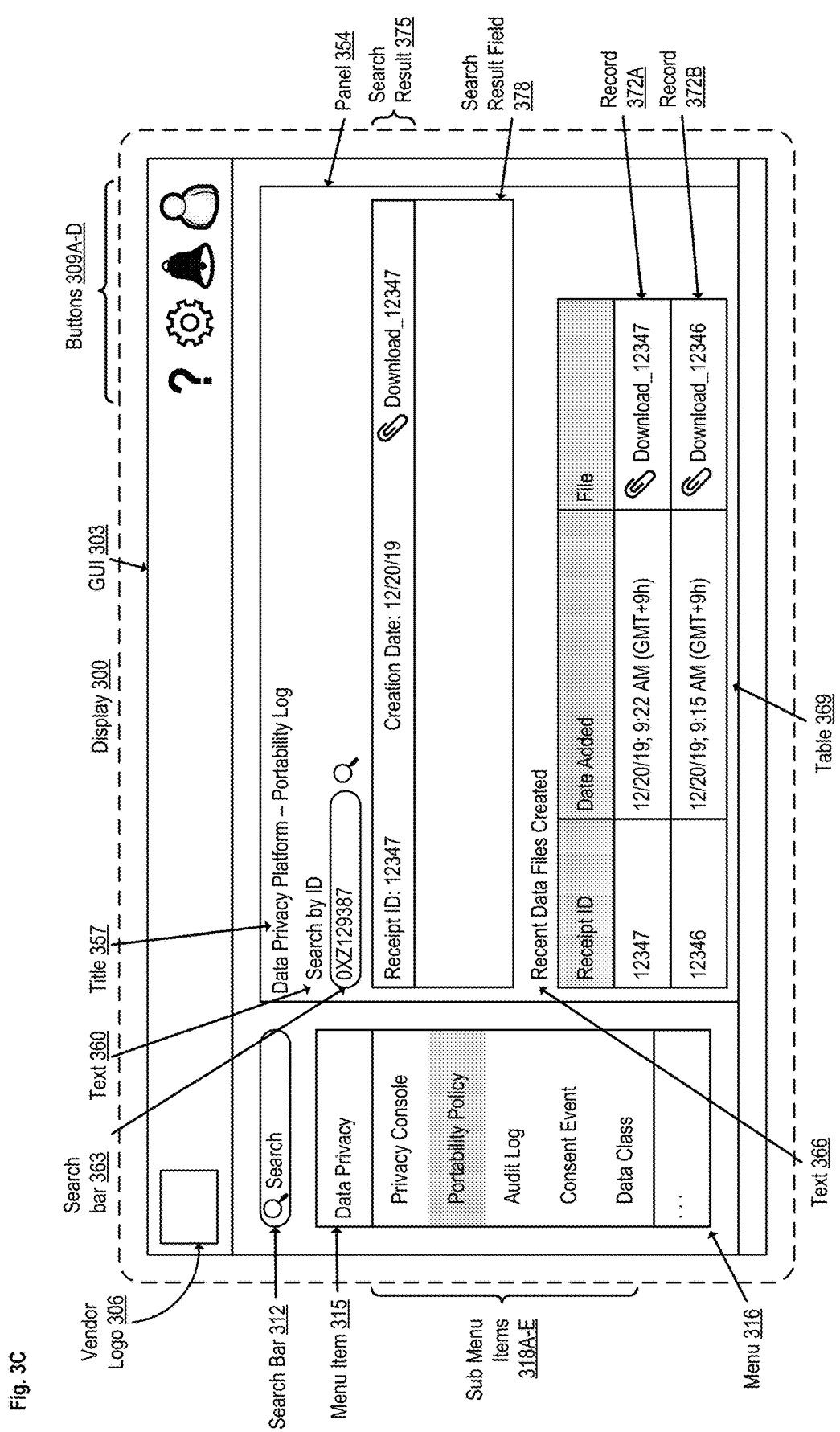
FIG. 3C is a diagram that shows a GUI which allows a user to view a log of requests from persons for data that pertains to those persons, and of documents created that contain that data, according to some implementations.

FIG. 3C is a diagram that shows a GUI which allows a user to view a log of requests from persons for data that pertains to those persons, and of documents created that contain that data, according to some implementations. Elements shown in FIG. 3C with reference numbers common to elements shown in one or both of FIG. 3A and FIG. 3B have been described referring to same.

FIG. 3C shows panel 354, which includes title 357 with text "Data Privacy Platform—Portability Log." Panel 354 also includes search bar 363 shown with entered text "0XZ129387." Search bar 363 is below text 360 which reads "Search by ID." Search bar 363 allows a user to enter text corresponding to an ID of a record in a database, and search a log for log entries that are associated with the ID of the record. Referring back to FIG. 1A, in one implementation, responsive to receiving query 108, an entry is included in a log, where the entry indicates that the query 108 was received. Additionally, or alternatively, responsive to the storing the data in the document 182 (i.e., in block 134), a further entry is included in the log, where the further entry indicates that the data that pertains to the person was stored in the document 182. Thus, a user can use search bar 363 to search for any queries (e.g. query 108)/requests (e.g., request 104) that stored data in a document 182 where that data was retrieved from a record with a given ID (e.g., first record 158 which includes primary key 164A with value "3"). Other implementations allow a user to search a log with PII for entries corresponding to the PII, or to search a log with any text string for entries that match that text string.

As shown in FIG. 3C, search result field 378 shows search result 375 responsive to the entry of the search string "0XZ129387" in search bar 363. Search result 375 includes the text "Receipt ID: 12347" (which corresponds to a unique ID assigned to the receipt of query 108 which referenced object with ID "0XZ129387"); the text "Creation Date: 12/20/2019" (which corresponds to a date that a document 182 was stored responsive to receiving the query 108); and, shown to the right of an icon showing a paperclip, the text "Download_12347" (which corresponds to a link at which the document can be found).

Panel 354 also includes text 366, which reads "Recent Data Files Created" and table 369, which includes record 372A and record 372B for recently created data files (i.e., documents 182). Notably, each record 372 includes a receipt ID (which corresponds to a unique ID assigned to the receipt of the corresponding query 108), a timestamp at which the document 182 for the request was stored, and a link to the document 182.

Example Electronic Devices and Environments

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices (also referred to as devices) are designed for and/or used for a variety of purposes, and different terms may reflect those purposes (e.g., user devices, network devices). Some user devices are designed to mainly be operated as servers (sometime referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, etc.). The software executed to operate a user device (typically a server device) as a server may be referred to as server software or server code), while the software executed to operate a user device (typically a client device) as a client may be referred to as client software or client code. A server provides one or more services to (also referred to as serves) one or more clients.

The term "user" refers to an entity (e.g., an individual person) that uses an electronic device, and software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
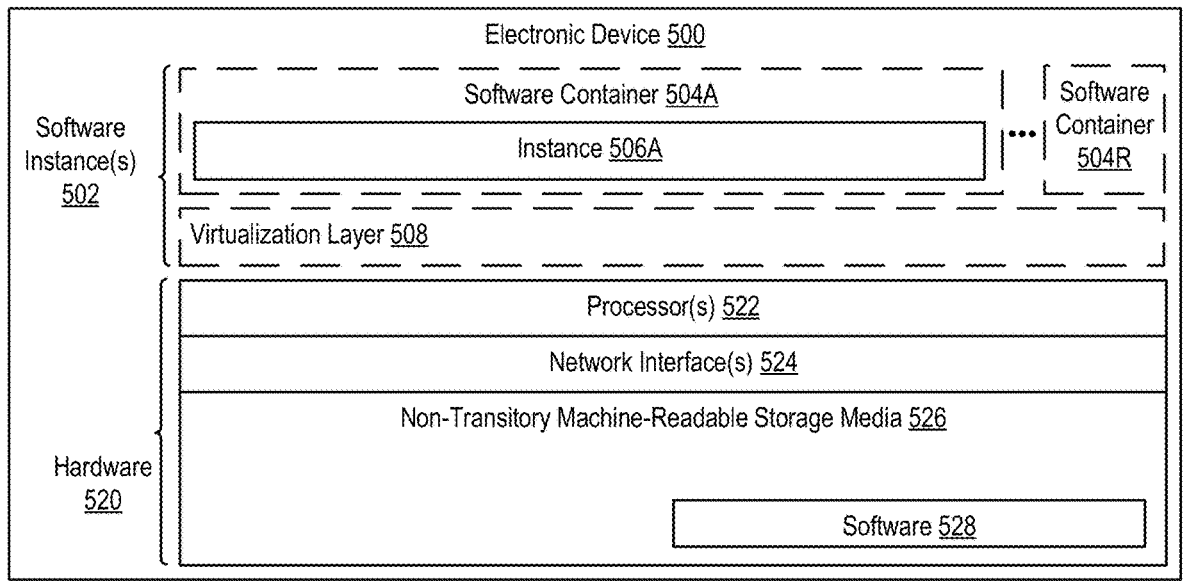
FIG. 5A is a block diagram illustrating an electronic device according to some implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Each of the previously described clients, the policy engine, and/or the policy management service may be implemented in one or more electronic devices 500. In one implementation, the policy engine includes one or more of block 118, block 124, and block 134. In another implementation, the policy management service includes block 400. In a further implementation, the policy management service and/or the policy engine include repository 140 and database(s) 154. In other implementations, one of repository 140 and database(s) 154 are implemented as separate services to the policy management service and/or policy engine. In one implementation, the policy engine and/or policy management service are available to one or more clients (e.g., system 106); in another implementation, the policy engine and/or policy management service are included in a system (e.g., system 106) and available to one or more clients via that system (e.g., to user 100 of electronic device 102). In one implementation: 1) each of the clients is implemented in a separate one of the electronic devices 500 (e.g., in end user devices where the software 528 represents the software to implement clients to interface directly and/or indirectly with the policy management service and/or policy engine (e.g., software 528 represents a web browser, a native client, a portal, a command-line interface, and/or an API based upon protocols such as Simple Object Access Protocol (SOAP), Representational State Transfer (REST), etc.)); 2) the policy management service and/or policy engine is implemented in a separate set of one or more of the electronic devices 500 (e.g., a set of one or more server devices where the software 528 represents the software to implement the policy management service and/or policy engine); and 3) in operation, the electronic devices implementing the clients and the policy management service and/or policy engine would be communicatively coupled (e.g., by a network) and would establish between them (or through one or more other layers and/or or other services) connections for submitting 1) keystrokes or other UI events to the policy management service and returning data to the clients; and/or 2) requests 104 for data pertaining to persons or queries 108 to the policy engine and returning a document 182 (or a location thereof) to the clients. Other configurations of electronic devices may be used in other implementations (e.g., an implementation in which the client and policy management service and/or policy engine service are implemented on a single electronic device 500).

During operation an instance of the software 528 (illustrated as instance 506A and also referred to as a software instance; and in the more specific case of an application, as an application instance) is executed. In electronic devices that use compute virtualization, the set of one or more processor(s) 522 typically execute software to instantiate a virtualization layer 508 and software container(s) 504A-R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation an instance of the software 528 is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

Example Environment

Figure 5B:
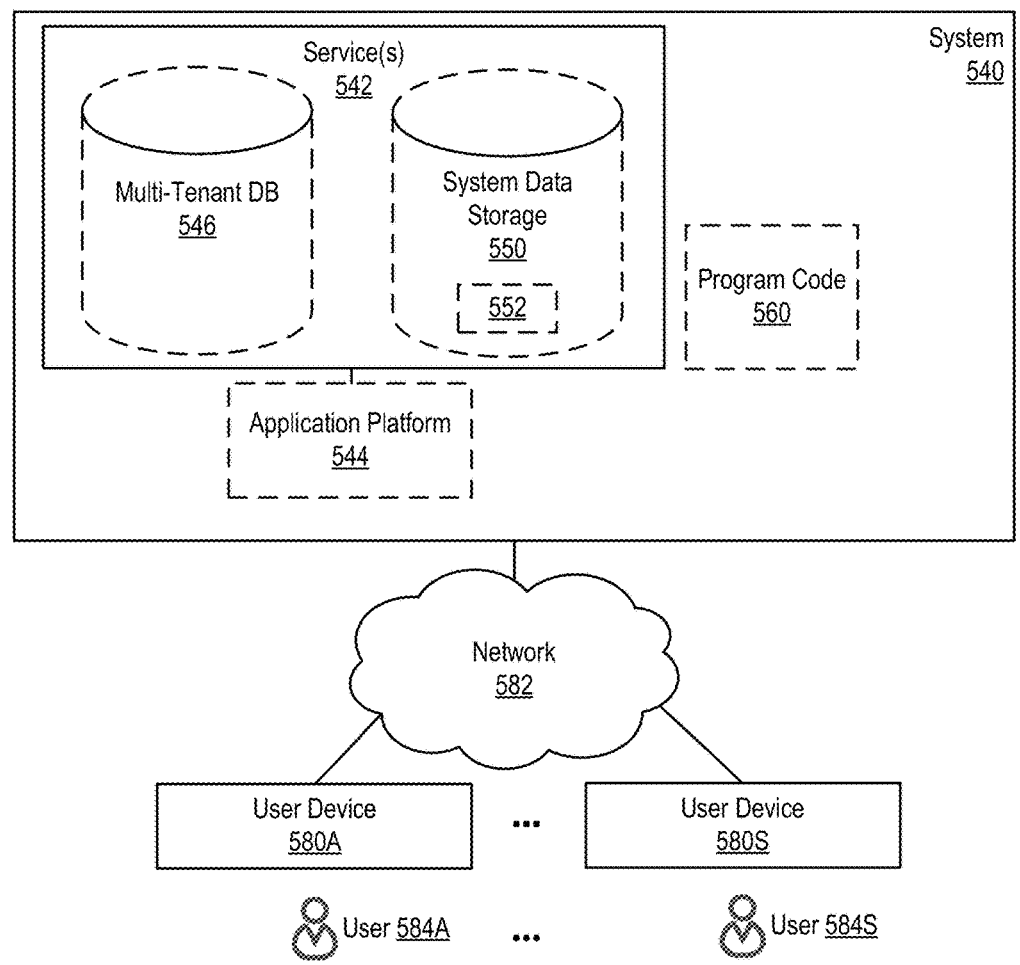
FIG. 5B is a block diagram of an environment where a policy engine and/or policy management service may be deployed, according to some implementations.

FIG. 5B is a block diagram of a deployment environment according to some example implementations. A system 540 includes hardware (e.g., a set of one or more server devices) and software to provide service(s) 542, including the policy management service and/or policy engine. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third party datacenter(s), which are datacenter(s) owned and/or operated by one or more different entities than the entity that provides the service(s) 542 (e.g., the different entities may host some or all of the software provided and/or operated by the entity that provides the service(s) 542). For example, third party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-S over a network 582. The service(s) 542 may be on-demand services that are made available to one or more of the users 584A-S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-S). The service(s) 542 may communicate with each other and/or with one or more of the user devices 580A-S via one or more APIs (e.g., a REST API). The user devices 580A-S are operated by users 584A-S.

In some implementations the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 540 is a multi-tenant cloud computing architecture supporting multiple services, such as one or more of the following:

| Type of Service | Example Service(s) by salesforce.com, inc. |
| --- | --- |
| Customer relationship management (CRM) | Sales Cloud |
| Configure, price, quote (CPQ) | CPQ and Billing |
| Business process modeling (BPM) | Process Builder |
| Customer support | Service Cloud, Field Service Lightning |
| Marketing | Commerce Cloud Digital, Commerce Cloud Order Management, Commerce Cloud Store |
| External data connectivity | Salesforce Connect |
| Productivity | Quip |
| Database-as-a-Service | Database.com ™ |
| Data-as-a-Service (DAAS or DaaS) | Data.com |
| Platform-as-a-service (PAAS or PaaS) | Heroku ™ Enterprise, Thunder, Force.com ®, Lightning, policy management service and/or policy engine |
| Infrastructure-as-a-Service (IAAS or IaaS) (e.g., virtual machines, servers, and/or storage) | |
| Analytics | Einstein Analytics, Sales Analytics, Service Analytics |
| Community | Community Cloud, Chatter |
| Internet-of-Things (IoT) | Salesforce IoT, IoT Cloud |
| Industry-specific | Financial Services Cloud, Health Cloud |
| Artificial intelligence (AI) | Einstein |
| Application marketplace ("app store") | AppExchange, AppExchange Store Builder |
| Data modeling | Schema Builder |
| Security | Salesforce Shield |
| Identity and access management (IAM) | Field Audit Trail, Platform Encryption, IT Governance, Access Management, Salesforce Identity, Salesforce Authenticator |

For example, system 540 may include an application platform 544 that enables PAAS for creating, managing, and executing one or more applications developed by the provider of the application platform 544, users accessing the system 540 via one or more of user electronic devices 580A-S, or third-party application developers accessing the system 540 via one or more of user electronic devices 580A-S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user electronic device 580A-S communicate with the server(s) of system 540 to request and update tenant-level data and system-level data hosted by system 540, and in response the system 540 (e.g., one or more servers in system 540) automatically may generate one or more SQL statements (e.g., one or more SQL queries) that are designed to access the desired information from the one or more multi-tenant database 546 and/or system data storage 550.

In some implementations, the service(s) 542 are implemented using virtual applications dynamically created at run time responsive to queries from the user electronic devices 580A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the policy management service and/or policy engine, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user electronic devices 580A-S.

Each user electronic device 580A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow a user 584 to interact with various GUI pages that may be presented to a user 584. User electronic devices 580A-S might communicate with system 540 using TCP/IP (Transfer Control Protocol and Internet Protocol) and, at a higher network level, use other networking protocols to communicate, such as HyperText Transfer Protocol ("HTTP"), Andrew File System ("AFS"), Wireless Application Protocol ("WAP"), File Transfer Protocol ("FTP"), Network File System ("NFS"), an API based upon protocols such as SOAP, REST, etc. In an example where HTTP is used, one or more user electronic devices 580A-S might include an HTTP client, commonly referred to as a "browser," for sending and receiving HTTP messages to and from server(s) of system 540, thus allowing users 584 of the user electronic device 580A-S to access, process and view information, pages and applications available to it from system 540 over network 582.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is provided as an example and is not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for using policies to comply with a request from a person for data that pertains to the person, pursuant to applicable data privacy laws, the method comprising:
   responsive to receiving a query submitted by a user of a database that includes an identifier for a policy and data to identify records that store data pertaining to the person, retrieving the policy corresponding to the identifier for the policy, wherein the policy is configurable to reflect a manner to comply with the applicable data privacy laws and indicates first and second database objects of the database from which to retrieve data and for those first and second database objects, respective first and second sets of one or more fields from which to retrieve data, wherein the respective first and second sets of one or more fields store data that pertains to persons;
   applying the policy, the applying comprising:
      determining, based on the data to identify records, that data is to be retrieved from a first record of the first database object;
      determining, based on information included in the policy, that data is to be retrieved from the first set of one or more fields of the first database object and the second set of one or more fields of the second database object;
      retrieving, from the first database object, data stored in the first set of one or more fields of the first record as a first set of values, wherein the first record is associated with the data to identify records, and
      retrieving, from the second database object, data stored in the second set of one or more fields of a second record as a second set of values, wherein the retrieving is based on an association between the first and second records that is indicated within one or more of the first and second records,
      wherein permissions granted to the user on the database are disregarded when applying the policy that was identified in the query submitted by the user by having a different user of the database with elevated privileges perform the retrieving from the first database object and the retrieving from the second database object to favor compliance with the applicable data privacy laws reflected by the policy over the permissions granted to the user; and
   storing, in a document, each value of the first and second set of values and, for each value, a name for a respective field of the first and second sets of one or more fields from which the value was retrieved.

2. The method of claim 1, wherein the association between the first and second records is based on the first database object including a primary key that the second database object references as a foreign key.

3. The method of claim 1, wherein the association between the first and second records is based on the second database object including a primary key that the first database object references as a foreign key.

4. The method of claim 1, wherein
the policy further indicates a third database object and for the third database object, a third set of one or more fields, which store data that pertains to persons,
the applying the policy further comprises retrieving, from the third database object, data stored in the third set of one or more fields of a third record as a third set of values, wherein the retrieving is based on an association between the first and third records that is indicated within one or more of the first and third records, and
the storing further comprises storing, in the document, each value of the third set of values and, for each value, a name for a respective field of the third set of fields from which the value was retrieved.

5. The method of claim 4, wherein
the association between the first and second records is based on the first database object including a primary key that the second database object references as a foreign key, and
the association between the first and third records is based on the third database object including a primary key that the first database object references as a foreign key.

6. The method of claim 1, wherein the person is a user of a system, wherein the system submitted the query on behalf of the user, and wherein permissions granted to the user do not include those required for at least one of retrieving the data stored in the first set of fields of the first record and retrieving the data stored in the second set of fields of the second record.

7. The method of claim 1, further comprising:
including in a log a first entry that indicates that the query was received; and
including in the log a second entry that indicates that the data that pertains to the person was stored in the document.

8. The method of claim 1, wherein at least one value of the first and second sets of values is a NULL value, and wherein the at least one value is stored in the document to indicate that no data pertaining to the person is stored in the respective one of the first and second sets of fields.

9. The method of claim 1, wherein the query is associated with a customer support request for which a ticket is created, and wherein the document is made available to the person for retrieval through the ticket.

10. The method of claim 1, wherein a status for the policy indicates whether the policy is to be applied or not to be applied, and wherein the applying the policy is responsive to determining that the status for the policy indicates that the policy is to be applied.

11. A non-transitory machine-readable medium that provides instructions that, if executed by a processor, are capable of causing operations for using policies to comply with a request from a person for data that pertains to the person, pursuant to applicable data privacy laws, the operations comprising:
responsive to receiving a query submitted by a user of a database that includes an identifier for a policy and data to identify records that store data pertaining to the person, retrieving the policy corresponding to the identifier for the policy, wherein the policy is configurable to reflect a manner to comply with the applicable data privacy laws and indicates first and second database objects of the database from which to retrieve data and for those first and second database objects, respective first and second sets of one or more fields from which to retrieve data, wherein the respective first and second sets of one or more fields store data that pertains to persons;
applying the policy, the applying comprising:
determining, based on the data to identify records, that data is to be retrieved from a first record of the first database object,
determining, based on information included in the policy, that data is to be retrieved from the first set of one or more fields of the first database object and the second set of one or more fields of the second database object,
retrieving, from the first database object, data stored in the first set of one or more fields of the first record as a first set of values, wherein the first record is associated with the data to identify records, and
retrieving, from the second database object, data stored in the second set of one or more fields of a second record as a second set of values, wherein the retrieving is based on a key that is shared by the first and second records,
wherein permissions granted to the user on the database are disregarded when applying the policy that was identified in the query submitted by the user by having a different user of the database with elevated privileges perform the retrieving from the first database object and the retrieving from the second database object to favor compliance with the applicable data privacy laws reflected by the policy over the permissions granted to the user; and
storing, in a document, each value of the first and second set of values and, for each value, a name for a respective field of the first and second sets of one or more fields from which the value was retrieved.

12. The non-transitory machine-readable medium of claim 11, wherein the key that is shared by the first and second records is a primary key included in the first database object, wherein the primary key is referenced by the second database object as a foreign key.

13. The non-transitory machine-readable medium of claim 11, wherein the key that is shared by the first and second records is a primary key included in the second database object, wherein the primary key is referenced by the first database object as a foreign key.

14. The non-transitory machine-readable medium of claim 11, wherein the policy further indicates a third database object and for the third database object, a third set of one or more fields, which store data that pertains to persons, and wherein the non-transitory machine-readable medium further provides instructions that, when executed by the processor, are capable of causing further operations comprising:
retrieving, from the third database object, data stored in the third set of one or more fields of a third record as a third set of values, wherein the retrieving is based on another key that is shared by the first and third records; and storing, in the document, each value of the third set of values and, for each value, a name for a respective field of the third set of fields from which the value was retrieved.

15. The non-transitory machine-readable medium of claim 14, wherein
the key that is shared by the first and second records is a first primary key included in the second database object,
the first primary key is referenced by the second database object as a first foreign key,
the another key that is shared by the first and third records is a second primary key included in the first database object, and
the second primary key is referenced by the third database object as a second foreign key.

16. The non-transitory machine-readable medium of claim 11, wherein the person is a user of a system, wherein the system submitted the query on behalf of the user, and wherein permissions granted to the user do not include those required for at least one of retrieving the data stored in the first set of fields of the first record and retrieving the data stored in the second set of fields of the second record.

17. The non-transitory machine-readable medium of claim 11, wherein the non-transitory machine-readable medium further provides instructions that, when executed by the processor, are capable of causing further operations comprising:
including in a log a first entry that indicates that the query was received; and
including in the log a second entry that indicates that the data that pertains to the person was stored in the document.

18. The non-transitory machine-readable medium of claim 11, wherein at least one value of the first and second sets of values is a NULL value, and wherein the at least one value is stored in the document to indicate that no data pertaining to the person is stored in the respective one of the first and second sets of fields.

19. The non-transitory machine-readable medium of claim 11, wherein the query is associated with a customer support request for which a ticket is created, and wherein the document is made available to the person for retrieval through the ticket.

20. The non-transitory machine-readable medium of claim 11, wherein a status for the policy indicates whether the policy is to be applied or not to be applied, and wherein the applying the policy is responsive to determining that the status for the policy indicates that the policy is to be applied.

* * * * *